United States Patent
Haldren et al.

(10) Patent No.: US 11,519,881 B2
(45) Date of Patent: Dec. 6, 2022

(54) METHOD FOR THE EVALUATION OF ADHESIVE BOND STRENGTH VIA SWEPT-FREQUENCY ULTRASONIC PHASE MEASUREMENTS

(71) Applicant: UNITED STATES OF AMERICAS AS REPRESENTED BY THE ADMINISTRATOR OF NASA, Washington, DC (US)

(72) Inventors: Harold A. Haldren, Silver Spring, MD (US); Daniel F. Perey, Yorktown, VA (US); William T. Yost, Suffolk, VA (US); K. Elliott Cramer, Yorktown, VA (US); Mool C. Gupta, Keswick, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 100 days.

(21) Appl. No.: 17/209,934

(22) Filed: Mar. 23, 2021

(65) Prior Publication Data
US 2021/0302380 A1 Sep. 30, 2021

Related U.S. Application Data

(60) Provisional application No. 62/994,313, filed on Mar. 25, 2020.

(51) Int. Cl.
*G01N 29/12* (2006.01)
*G01N 29/44* (2006.01)

(52) U.S. Cl.
CPC ............ *G01N 29/12* (2013.01); *G01N 29/44* (2013.01); *G01N 2291/014* (2013.01); *G01N 2291/044* (2013.01); *G01N 2291/102* (2013.01)

(58) Field of Classification Search
CPC ...... G01N 29/12; G01N 29/44; G01N 29/343; G01N 29/46; G01N 2291/014;
(Continued)

(56) References Cited

U.S. PATENT DOCUMENTS

| 4,295,375 A | 10/1981 | Otto et al. |
| 4,538,462 A | 9/1985 | Hartog et al. |

(Continued)

OTHER PUBLICATIONS

Yost, W., et al. "Constant frequency pulsed phase-locked-loop instrument for measurement of ultrasonic velocity." Re. Sci. Instrum., Oct. 1991, pp. 2451-2455, 62 (10), American Institute of Physics (AIP) Publishing, United States.
(Continued)

*Primary Examiner* — Tarun Sinha
(74) *Attorney, Agent, or Firm* — M. Bruce Harper; Robin W. Edwards; Helen M. Galus

(57) ABSTRACT

A method and system for ultrasonic testing of adhesion within a sample, which provides ultrasonic bursts of different frequencies to the sample and maintains a predetermined phase difference between echoes returned from the sample and representative reference signals of the bursts supplied to the sample until a spectrum of the phase differences versus frequency is obtained and from which properties of the adhesion at an interface reflecting the echoes are derivable.

20 Claims, 14 Drawing Sheets

(58) Field of Classification Search
CPC ..... G01N 2291/102; G01N 2291/0231; G01N 2291/101
See application file for complete search history.

(56) References Cited

U.S. PATENT DOCUMENTS

| | | | |
|---|---|---|---|
| 8,667,844 | B1 | 3/2014 | Broadbent et al. |
| 9,347,868 | B2 | 5/2016 | Van Voast et al. |
| 10,408,719 | B2 | 9/2019 | Pinillos Martínez et al. |
| 2013/0289895 | A1* | 10/2013 | Maev ..................... G01N 29/30 702/39 |

OTHER PUBLICATIONS

Baik, J., et al. "Ultrasonic Scattering from Imperfect Interfaces: A Quasi-Static Model." J. Nondestruct. Eval., Dec. 1984, pp. 177-196, 4, Springer Nature, London.

Adler, L., et al. "Angle Beam Ultrasonic Spectroscopy System for Quantitative Inspection of Adhesive Bonds." In: Thompson D.O., Chimenti D.E. (eds), Review of Progress in Quantitative Nondestructive Evaluation, 1999, pp. 1553-1559, 18 A, Springer, Boston, MA.

Milne, K., et al. "Ultrasonic Non-destructive Evaluation of Titanium Diffusion Bonds." J. Nondestruct. Eval., Jul. 2011, pp. 225-236, 30, Springer Nature, London.

Haldren, H., et al. "A digital, constant-frequency pulsed phase-locked-loop instrument for real-time, absolute ultrasonic phase measurements." Re. Sci. Instrum, May 2018, 89 (5), AIP Publishing, United States.

* cited by examiner

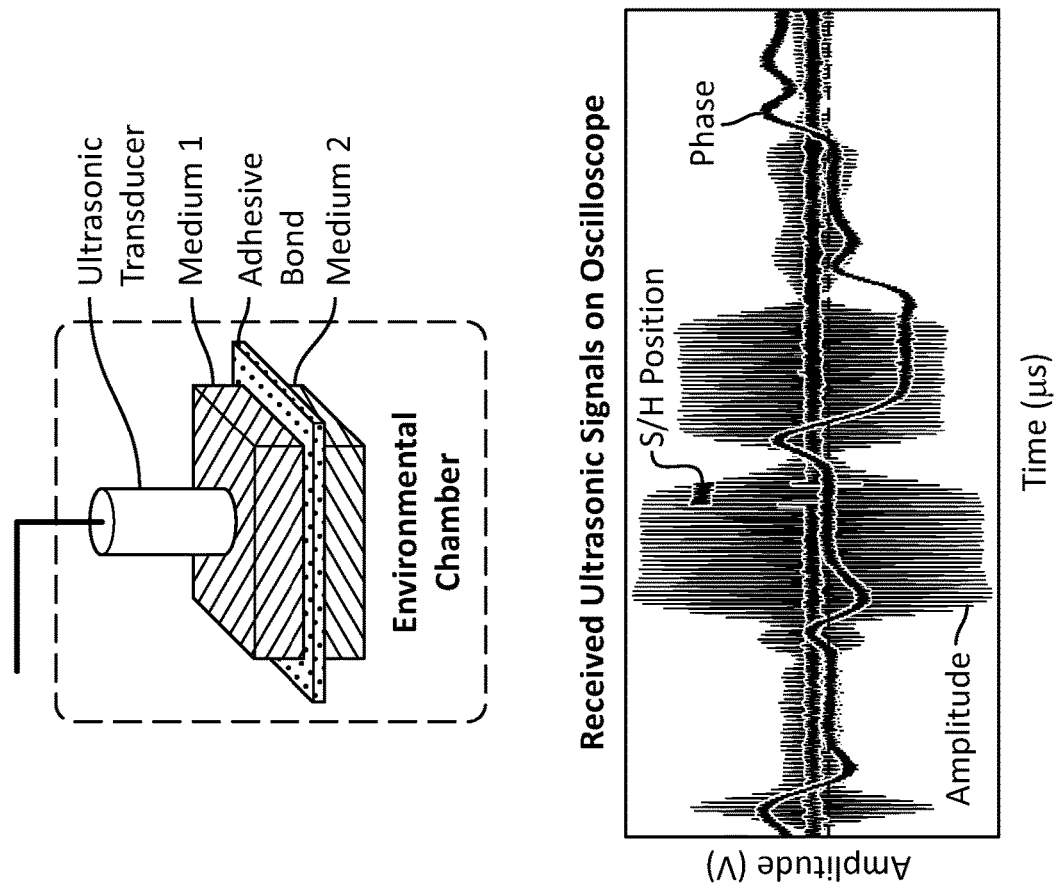
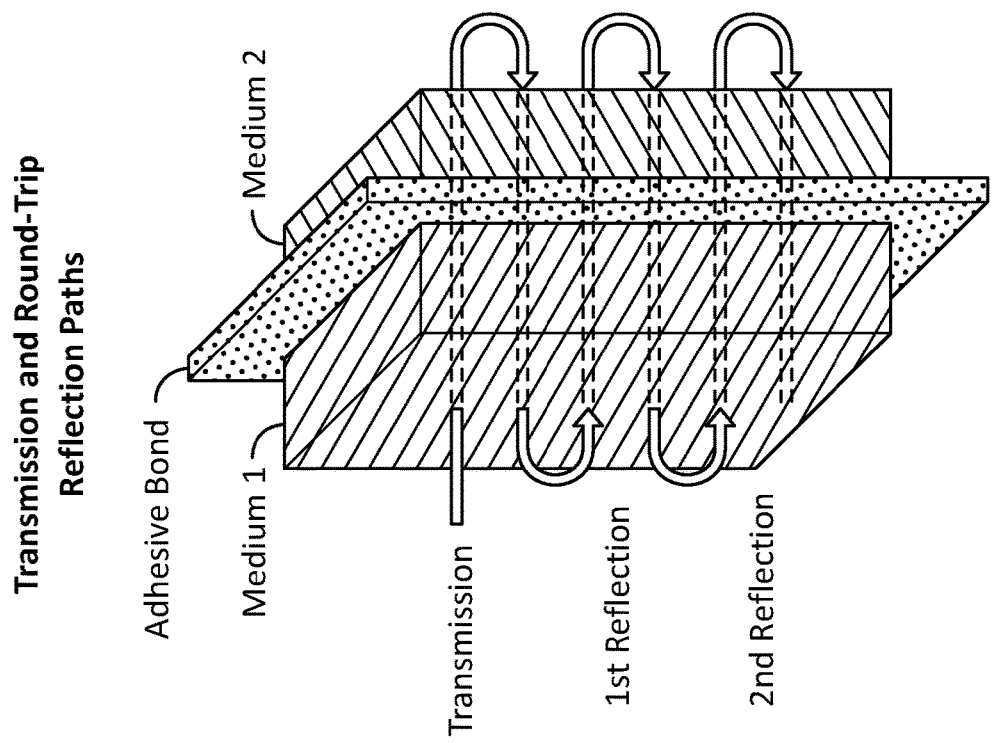
FIG. 1D

Table I: Ultrasonic Wave Displacement and Stress Equations in Each Medium

| Medium (Subscript) | Displacement | Stress |
|---|---|---|
| Adherent (1) | $u_1(x) = e^{-k_1 x} + R_{BL} e^{k_1 x}$ | $\sigma_1(x) = -E_1 k_1 (e^{-k_1 x} - R_1 e^{k_1 x})$ |
| Adhesive (adh) | $u_{adh}(x) = T_{adh} e^{-k_{adh} x} + R_{adh} e^{k_{adh} x}$ | $\sigma_{adh}(x) = -E_{adh} k_{adh} (T_{adh} e^{-k_{adh} x} - E_{adh} e^{k_{adh} x})$ |
| Adherent (2) | $u_2(x) = T_o e^{-k_2 (x - L_{BL})}$ | $\sigma_2(x) = -E_2 k_2 T_o e^{-k_2 (x - L_{BL})}$ |

FIG. 3

Table II: Imperfect Interface Boundary Conditions in SLJ Model

| Interface | Interfacial Stiffness Boundary Condition | Interfacial Mass Boundary Condition |
|---|---|---|
| Upper Adherent - Adhesive ($x = 0$) | $\sigma_1(0) + \sigma_{adh}(0) = 2K_1 (u_{adh}(0) - u_1(0))$ | $-m_1 \omega^2 (u_{adh}(0) + u_1(0)) = 2(\sigma_{adh}(0) - \sigma_1(0))$ |
| Lower Adhesive - Adherent ($x = L_{BL}$) | $\sigma_{adh}(L_{BL}) + \sigma_2(L_{BL}) = 2K_2 (u_2(L_{BL}) - u_{adh}(L_{BL}))$ | $-m_2 \omega^2 (u_2(L_{BL}) + u_{adh}(L_{BL})) = 2(\sigma_2(L_{BL}) - \sigma_{adh}(L_{BL}))$ |

FIG. 4

$$R_{BL} = \frac{C_N \cosh(k_{adh} L_{BL}) + S_N \sinh(k_{adh} L_{BL})}{C_D \cosh(k_{adh} L_{BL}) + S_D \sinh(k_{adh} L_{BL})}$$

$$C_N = (E_{adh} k_{adh}) \left[ (E_1 k_1 - E_2 k_2) \left( \frac{16}{m_1 m_2} + \frac{\omega^4}{K_1 K_2} - 4\omega^2 \left( \frac{1}{K_2 m_1} + \frac{1}{K_1 m_2} \right) \right) + \frac{4}{(K_1^{-1} + K_2^{-1})^{-1}} \left( \frac{4E_1 k_1 E_2 k_2}{m_1 m_2} - \omega^4 \right) \right.$$
$$\left. - \frac{4\omega^2}{(m_1^{-1} + m_2^{-1})^{-1}} \left( \frac{E_1 k_1 E_2 k_2}{K_1 K_2} - 4 \right) - 16\omega^2 \left( \frac{E_1 k_1}{K_1 m_1} - \frac{E_2 k_2}{K_2 m_2} \right) \right]$$

$$C_D = (E_{adh} k_{adh}) \left[ (E_1 k_1 + E_2 k_2) \left( \frac{16}{m_1 m_2} + \frac{\omega^4}{K_1 K_2} - 4\omega^2 \left( \frac{1}{K_2 m_1} + \frac{1}{K_1 m_2} \right) \right) + \frac{4}{(K_1^{-1} + K_2^{-1})^{-1}} \left( \frac{4E_1 k_1 E_2 k_2}{m_1 m_2} + \omega^4 \right) \right.$$
$$\left. - \frac{4\omega^2}{(m_1^{-1} + m_2^{-1})^{-1}} \left( \frac{E_1 k_1 E_2 k_2}{K_1 K_2} + 4 \right) + 16\omega^2 \left( \frac{E_1 k_1}{K_1 m_1} + \frac{E_2 k_2}{K_2 m_2} \right) \right]$$

$$S_N = (E_1 k_1 E_2 k_2 - E_{adh}^2 k_{adh}^2) \left( \frac{16}{m_1 m_2} + \frac{\omega^4}{K_1 K_2} - 4\omega^2 \left( \frac{1}{K_2 m_1} + \frac{1}{K_1 m_2} \right) \right) + 4 \left( \frac{E_1 k_1}{K_1} - \frac{E_2 k_2}{K_2} \right) \left( \frac{4E_{adh}^2 k_{adh}^2}{m_1 m_2} + \omega^4 \right)$$
$$- 4\omega^2 \left( \frac{E_1 k_1}{m_1} - \frac{E_2 k_2}{m_2} \right) \left( \frac{E_{adh}^2 k_{adh}^2}{K_1 K_2} + 4 \right) + 16 \left( \frac{E_1 k_1 E_{adh}^2 k_{adh}^2 E_2 k_2}{K_1 K_2 m_1 m_2} - \omega^4 \right)$$

$$S_D = (E_1 k_1 E_2 k_2 + E_{adh}^2 k_{adh}^2) \left( \frac{16}{m_1 m_2} + \frac{\omega^4}{K_1 K_2} - 4\omega^2 \left( \frac{1}{K_2 m_1} + \frac{1}{K_1 m_2} \right) \right) + 4 \left( \frac{E_1 k_1}{K_1} + \frac{E_2 k_2}{K_2} \right) \left( \frac{4E_{adh}^2 k_{adh}^2}{m_1 m_2} + \omega^4 \right)$$
$$- 4\omega^2 \left( \frac{E_1 k_1}{m_1} + \frac{E_2 k_2}{m_2} \right) \left( \frac{E_{adh}^2 k_{adh}^2}{K_1 K_2} + 4 \right) + 16 \left( \frac{E_1 k_1 E_{adh}^2 k_{adh}^2 E_2 k_2}{K_1 K_2 m_1 m_2} + \omega^4 \right)$$

FIG. 5

$$R_{BL} \approx \frac{C_N \cosh(k_{adh} L_{BL}) + S_N \sinh(k_{adh} L_{BL})}{C_D \cosh(k_{adh} L_{BL}) + S_D \sinh(k_{adh} L_{BL})}$$

$$C_N = (E_1 k_1 E_{adh} k_{adh}) \left[ \frac{E_1 k_1}{(K_1^{-1} + K_2^{-1})^{-1}} \right]$$

$$C_D = (E_1 k_1 E_{adh} k_{adh}) \left[ 2 + \frac{E_1 k_1}{(K_1^{-1} + K_2^{-1})^{-1}} \right]$$

$$S_N = (E_1^2 k_1^2 - E_{adh}^2 k_{adh}^2) + E_1 k_1 E_{adh}^2 k_{adh}^2 \left( \frac{1}{(K_1^{-1} + K_2^{-1})^{-1}} + \frac{E_1 k_1}{K_1 K_2} \right)$$

$$S_D = (E_1^2 k_1^2 + E_{adh}^2 k_{adh}^2) + E_1 k_1 E_{adh}^2 k_{adh}^2 \left( \frac{1}{(K_1^{-1} + K_2^{-1})^{-1}} + \frac{E_1 k_1}{K_1 K_2} \right)$$

FIG. 6

METHOD FOR THE EVALUATION OF ADHESIVE BOND STRENGTH VIA SWEPT-FREQUENCY ULTRASONIC PHASE MEASUREMENTS

CROSS-REFERENCE TO RELATED PATENT APPLICATION(S)

This patent application claims the benefit of and priority to U.S. Ser. No. 62/994,313, filed on Mar. 25, 2020, the contents of which are hereby incorporated by reference in their entirety.

STATEMENT REGARDING FEDERALLY SPONSORED RESEARCH OR DEVELOPMENT

The invention described herein was made in part by an employee/employees of the United States Government and may be manufactured and used by and for the Government of the United States for governmental purposes without the payment of any royalties thereon or therefore.

BACKGROUND OF THE INVENTION

This invention is related to the field of ultrasonic testing of bonded joints.

Many articles, such as parts or finished goods, have paints or finishes or coatings applied to them as part of their manufacturing process. How well a paint or finish or coating adheres to the surface of an article to which it is applied depends upon several factors, including: the paint or finish or coating composition, the surface composition, the conditioning of the surface prior to application of paint or finish or coating, the presence of an undercoat or intercoat prior to application of an outer coat, the temperature and humidity during application, the method of curing or drying of the paint or finish, and the time allowed for the paint or finish to cure or dry. However, even with rigidly controlled manufacturing processes, variations in adhesion occur.

To determine the adhesion to the article surface, coatings are sometimes tested using a material or device that is pressed against the coating surface for a certain duration and then removed. For example, a material such as a pressure sensitive adhesive tape (often known as the "Scotch tape test") is secured to the coating and then removed. If any coating is removed with the tape, then the adhesion of the coating is deemed to have failed the test.

In another example, a metal dolly having a flat circular surface is secured to the coating using an adhesive. Once the adhesive has cured, the dolly is pulled at various pressures until the dolly pulls the coating from the article or the adhesive detaches from the dolly or coating. In one variation of this method, a cutting tool is used to drill a channel through the coating to the article's surface around the dolly to isolate the test area. These test methods are destructive to the coating.

Techniques for nondestructive measurements of adhesive bond strength has been an active research area for some time. Advancements in adhesive bonding applications in aerospace and automotive design has increased the need for bond validation, as adhesive bonding is a preferred method of joining advanced composite structures and is increasingly used in aerospace design and structural repair.

While precise control of environmental conditions and the bonding process support the goal of consistent adhesion quality, inadequate surface preparation and accidental contamination still seriously degrade adhesion without being noticeable even to the trained observer or conventional inspections. Mechanical fatigue and environmental degradation reduce the strength of critical bonds, leading to their premature failure, which could lead to loss of equipment or loss of life. Thus, to certify bonded structures and verify sufficient remaining strength, it is of utmost importance to be able to non-destructively evaluate bonded joints after fabrication and during service life.

In recent years, the use of advanced composites in a number of areas has increased as modern designs strive for lighter weight, higher performance, reduced labor cost, and greater durability. In the same time frame, conventional nondestructive evaluation (NDE) methods have been used to detect bonding defects, such as delaminations, complete disbonds, and voids in an adhesive and in its attachment at structural surfaces. Even with careful control of the bonding procedure, destructive testing has shown that bonded joint strength shows substantial variation Prior art in this field of nondestructive evaluation (to be discussed in more detail later) has been found to be rather insensitive to weak interfacial bonding, which can lead to poor service life and potential catastrophic failures. While several specialized NDE methods have purported to have sensitivity to interfacial bond strength, these methods require complex, bulky, and time-extensive measurement procedures that, in many instances, are not adaptable to an assembly (shop) floor.

The following documents (the entire contents of which are incorporated herein by reference) are considered to be characteristic of the background art:

1. U.S. Pat. No. 4,295,375 entitled "Ultrasonic method of testing welded joints."
2. U.S. Pat. No. 4,538,462 entitled "Adhesive bond integrity evaluation method."
3. U.S. Pat. No. 8,667,844 entitled "Ultrasonic scalar adhesion test apparatus and method for paints and finishes."
4. U.S. Pat. No. 9,347,868 entitled "Methods and systems for rapidly testing adhesion."
5. U.S. Pat. No. 10,408,719 entitled "System and method for testing bonded joints."
6. US Pat. Appl. Publ. No. 2013/0289895 entitled "Method and system for assessing the quality of adhesively bonded joints using ultrasonic waves."
7. William T. Yost, John H. Cantrell, and P. W. Kushnick, "Constant frequency pulsed phase-locked-loop instrument for measurement of ultrasonic velocity," in Re. Sci. Instrum. 62 (10) October 1991, pp. 2451-2455.
8. Jai-Man Baik and R. Bruce Thompson, "Ultrasonic Scattering from Imperfect Interfaces: A Quasi-Static Model," in Journal of Nondestructive Evaluation, vol. 4, No. 3/4, 1984, pp. 177-196.
9. Laszlo Adler, Stanislav Rokhlin, Christophe Mattei, Gabor Blaho and Qiang Xie. "Angle Beam Ultrasonic Spectroscopy System for Quantitative Inspection of Adhesive Bonds," in Review of Progress in Quantitative Nondestructive Evaluation, Vol. 18, 1999, pp. 1553-1559.
10. K. Milne, P. Cawley, P. B. Nagy, D. C. Wright, and A. Dunhill. "Ultrasonic Non-destructive Evaluation of Titanium Diffusion Bonds," in J. Nondestruct. Eval. 30, pp. 225-236 (2011)
11. Harold A. Haldren, Daniel F. Perey, William T. Yost, K. Elliot Cramer, and Mool C. Gupta, "A digital, constant-frequency pulsed phase-locked-loop instrument for real-time, absolute ultrasonic phase measurements," in Review of Scientific Instruments, vol. 89, 054902, 2018.

BRIEF SUMMARY OF THE INVENTION

The present invention is related to methods and systems for ultrasonic testing of adhesion of for example various coatings to substrates.

One embodiment provides a method for ultrasonic testing of adhesion which generates a first burst of ultrasonic waves at a first frequency for a first predetermined duration, supplies the first burst into a sample having an interface which reflects the ultrasonic waves, measures a first echo of the ultrasonic waves from the interface, maintains a predetermined phase difference between the first echo returned from the sample and a first reference signal representative of the first burst supplied to the sample at a predetermined phase difference, generates a second burst of ultrasonic waves at a second frequency for a second predetermined duration, (wherein the second frequency is incremented from the first frequency) supplies the second burst into a sample, measures a second echo of the ultrasonic waves from the interface, maintains the predetermined phase difference between the second echo returned from the sample and a second reference signal representative of the second burst supplied to the sample. The method continues to provide bursts of different frequencies to the sample and maintains the predetermined phase difference between echoes returned from the sample and representative reference signals of the bursts supplied to the sample until a spectrum of a phase of ultrasonic wave reflection at the interface versus frequency is obtained.

One embodiment is a system for ultrasonic testing of adhesion comprising a) an ultrasonic wave generator configured to generate a first burst of ultrasonic waves at a first frequency for a first predetermined duration, b) an ultrasonic transducer configured to deliver the first burst into a sample having an interface which reflects the ultrasonic waves, c) an ultrasonic wave detector is configured to measure a first echo of the ultrasonic waves from the interface, and d) a processor configured to maintain a predetermined phase difference between the first echo returned from the sample and a first reference signal representative of the first burst supplied to the sample at a predetermined phase difference. The ultrasonic wave generator is configured to generate a second burst of ultrasonic waves at a second frequency for a second predetermined duration, wherein the second frequency is incremented from the first frequency. The ultrasonic transducer is configured to deliver the second burst into a sample. The ultrasonic wave detector is configured to measure a second echo of the ultrasonic waves from the interface, and the processor is configured to maintain the predetermined phase difference between the second echo returned from the sample and a second reference signal representative of the second burst supplied to the sample. The system continues to provide bursts of different frequencies to the sample and maintain the predetermined phase difference between echoes returned from the sample and representative reference signals of the bursts supplied to the sample until the processor obtains a spectrum of a phase of ultrasonic wave reflection at the interface versus frequency.

Another embodiment of the invention is a method for ultrasonic testing of adhesion which provides ultrasonic bursts of different frequencies to the sample and maintains a predetermined phase difference between echoes returned from the sample and representative reference signals of the bursts supplied to the sample until a spectrum of the phase differences versus frequency is obtained from which properties of the adhesion at an interface reflecting the echoes are derivable.

Yet another embodiment provides a system for ultrasonic testing of adhesion which provides ultrasonic bursts of different frequencies to the sample and maintains a predetermined phase difference between echoes returned from the sample and representative reference signals of the bursts supplied to the sample until a spectrum of the phase differences versus frequency is obtained from which properties of the adhesion at an interface reflecting the echoes are derivable.

Still another embodiment is a system for ultrasonic testing of adhesion, comprising a) an ultrasonic wave generator configured to generate a first burst of ultrasonic waves at a first frequency for a first predetermined duration, b) an ultrasonic transducer configured to deliver the first burst into a sample having an interface which reflects the ultrasonic waves, c) an ultrasonic wave detector is configured to measure a first echo of the ultrasonic waves from the interface, and d) a processor configured to monitor the first echo returned from the sample and a first reference signal representative of the first burst supplied to the sample, wherein the ultrasonic wave generator and the ultrasonic transducer are configured to provide bursts of different pulse widths, amplitudes and frequencies to the sample and the processor is configured to track cavity resonance as the amplitude of the bursts increase until the processor obtains a range of amplitudes and frequency shifts in the cavity resonance.

These and other features, advantages, and objects of the present invention will be further understood and appreciated by those skilled in the art by reference to the following specification, claims, and appended drawings. It is to be understood that both the foregoing general description of the invention and the following detailed description are exemplary, but are not restrictive of the invention.

BRIEF DESCRIPTION OF THE SEVERAL VIEWS OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1D is a schematic diagram illustrating reflective properties from a specimen;

FIG. 3 is a table showing ultrasonic displacement and stress equations in each medium of FIG. 2 as a function of position x;

FIG. 4 is a table of imperfect interface boundary conditions for a single lap joint model;

FIG. 5 is a depiction of the solution for the reflection coefficient at the boundary line;

FIG. 6 is a depiction of a simplification of the solution of FIG. 5;

DETAILED DESCRIPTION OF THE INVENTION

Figure 1A:
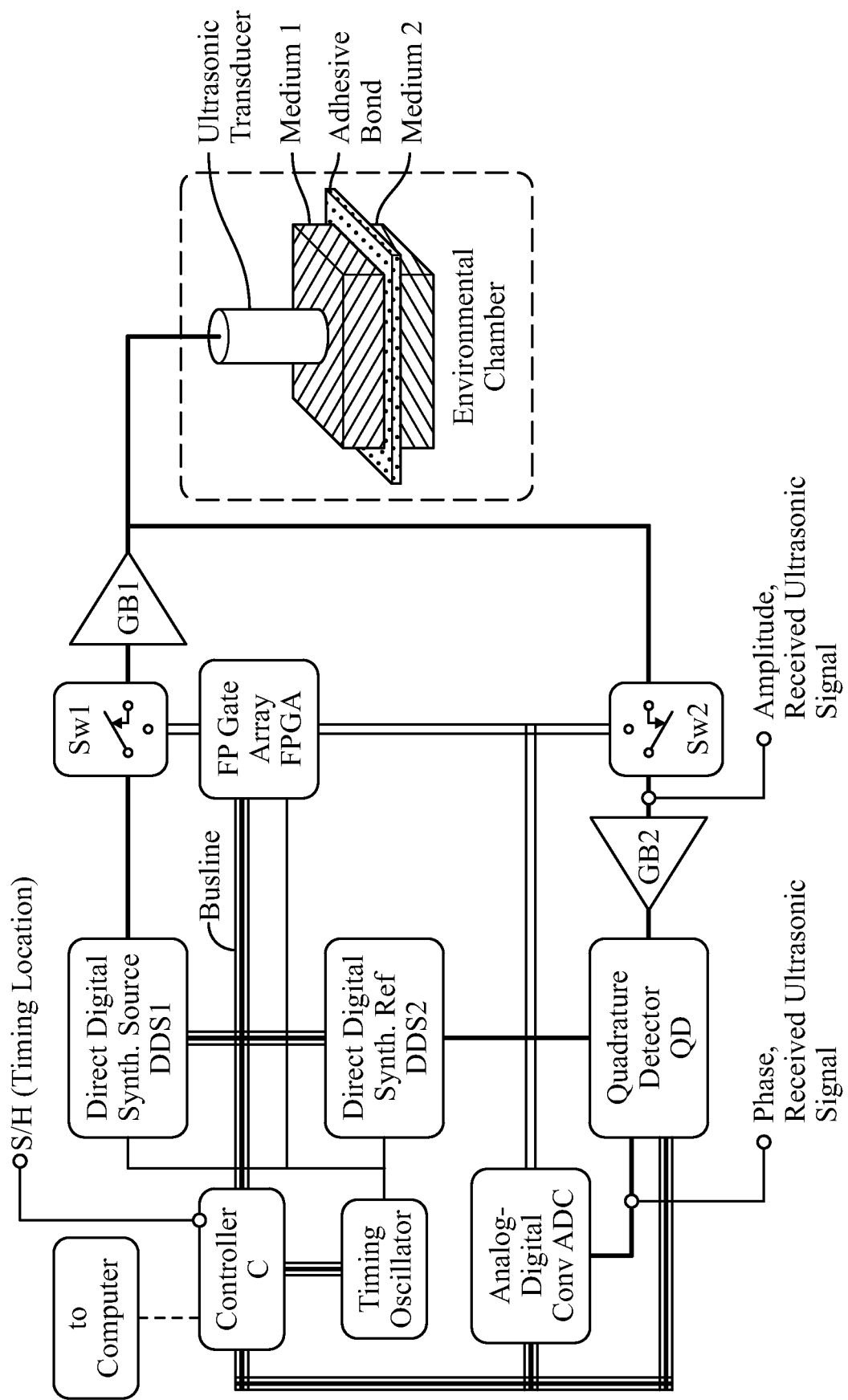
FIG. 1A is a schematic diagram showing one apparatus for ultrasonic testing.

For purposes of description herein, the terms "upper," "lower," "right," "left," "rear," "front," "vertical," "horizontal," and derivatives thereof shall relate to the invention as described herein and as shown in the various components and step sequences shown in the drawings. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. Also, characteristics of the invention are often described with the word "substantially" meaning that deviations from the characteristic being described are less than 10% of the norm and more preferably less than 5% of the norm, and still more preferably less than 2% of the norm.

As adhesive bonding has becoming one method for joining composite structures together, a nondestructive method is needed for ensuring adequate bonded joint strength when first fabricated, after bonded repairs, and throughout a joint's service life. Many NDE methods have been characterized on their ability to identify weak bonding and have generally proved able to detect many bonding defects such as porosity, de-laminations, and complete disbands. However, such techniques have been unable to detect "kissing" bond regions, where adhesive and adherent are in intimate contact but unable to support the transmission of tensile and shear stresses.

Moreover, the focus of most prior research into bonded joints used specialized ultrasonic methods to mechanically interrogate the bonded joint on the atomic level. Several ultrasonic methods have claimed sensitivity to the quality of the adhesive/adherent interface of bonded joint (i.e. the ability of the bond to transmit stresses). These methods often make use of a modelled mass-spring system. For many commonly-encountered adhesive interfaces, including a thin array of interfacial cracks, the interfacial mass contribution is negligible. As such, a massless spring interface model has also been used in several studies of adhesive bond evaluation with ultrasound. Accordingly, a massless spring model for imperfect adhesion and a more fully-developed model of ultrasonic interactions with imperfect interfaces including a mass-spring system have both been used.

Some prior methods tested related the shift in frequency of the amplitude minimum of both the normal and oblique incidence ultrasonic reflection coefficients of a bonded joint to the normal and shear interfacial stiffness moduli. One method in particular estimated the normal and shear interfacial stiffnesses from the characteristic frequency of the ultrasonic reflection coefficient, which was identified by the transition between low and high frequency regions of the amplitude response.

Other ultrasonic methods have used the phase response of a bonded joint to estimate adhesion quality. Others have used a pulse-echo overlap method to measure the phase of the reflection coefficient of an ultrasonic pulse in simulated kissing bonds. Indeed, the ultrasonic phase has been found to be sensitive to both interfacial stiffness and real surface area fractional contact. Kissing bonds were simulated by rough surface coupons in dry-contact held together by compressional stress. Recent work into ultrasonic phase-based techniques has focused on titanium diffusion bonding quality by using double-sided and single-sided interrogation methods. These results also found high signal-to-noise ratio to be essential with those techniques, with the standard deviation of phase measurements needing to be small enough to adequately identify a diffusion bond as good or bad. Angle-beam spectroscopic ultrasonic methods have shown sensitivity to interface quality—especially using shear waves—yet these methods utilize complex and time-consuming experimental setups, which make it challenging to use in a manufacturing or repair-facility setting. Thus, the recent use of ultrasonic phase in single-interface diffusion bonds, while showing excellent interfacial stiffness sensitivity, suffers from both the high signal-to-noise ratio required for interface characterization and the complex equipment needed to realize interfacial stiffness sensitivity.

Accordingly, despite prior methods showing some sensitivity to adhesion quality, no ultrasonic method has become an industry-accepted method of quantifiably measuring adhesion strength. The present inventors have identified that, the conventional amplitude vs. time ultrasonic measurements are not sensitive enough to identify weak interfacial bonding (such as kissing bonds) without there being present gross bonding defects.

The present inventive systems and methods overcome these deficiencies in prior techniques and permit relatively quick and accurate measures of interfacial bond strength. The present system and methods are compatible with assembly line and repair facilities, and their respective procedures. Indeed, in one embodiment is provided an accurate, robust quantitative nondestructive bond strength measurement method in which a phase-based ultrasonic method interrogates bonded joints for detecting weak adhesion by using swept-frequency phase measurements of ultrasonic waves reflected from an adhesive single lap joint. In one embodiment, by modeling adhesive interfaces as a distributed spring system, the inventors have demonstrated (as discussed later) that the interfacial stiffness constants of a joint can be determined from a zero-crossing frequency of the phase response and the "sharpness" or slope of the phase response.

FIG. 1A is a schematic of a digital pulsed phase-locked loop (DPPLL) system which is one system (an interferometric-type system) suitable for embodiments. In general, interferometers are phase-sensitive devices. The DPPLL system of FIG. 1A can be considered a digitally controlled interferometer which, when interfaced with an ultrasonic transducer, constitutes an ultrasonic interferometer instrument. The DPPLL system of FIG. 1A is configured in one embodiment to phase-compare the ultrasonic signal path with a reference electrical signal path that substitutes for a second signal path, a process typical in a conventional Michelson-based interferometer setup. Through a feed-back loop, the DPPLL system of FIG. 1A can be programmed to continuously adjust wave parameters (either frequency or phase) to maintain quadrature (a phase separation of $\pi/2$ or $3\pi/2$ or other predefined phase separation between the two signal paths) between the ultrasonic signal path and the reference electrical signal path.

Figure 1B:
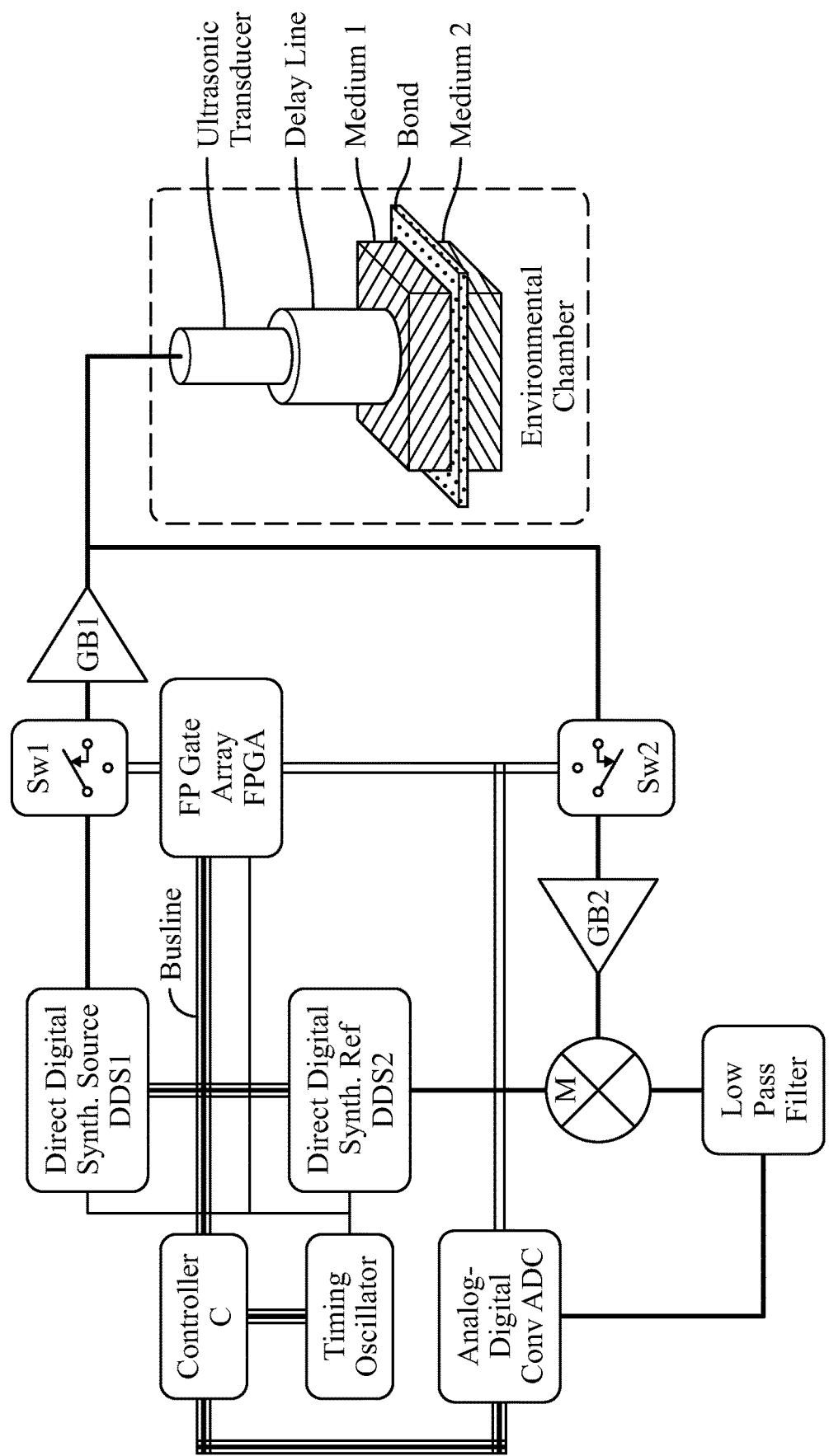
FIG. 1B is a schematic diagram showing another apparatus of embodiments of the present invention for ultrasonic testing.
Figure 1C:
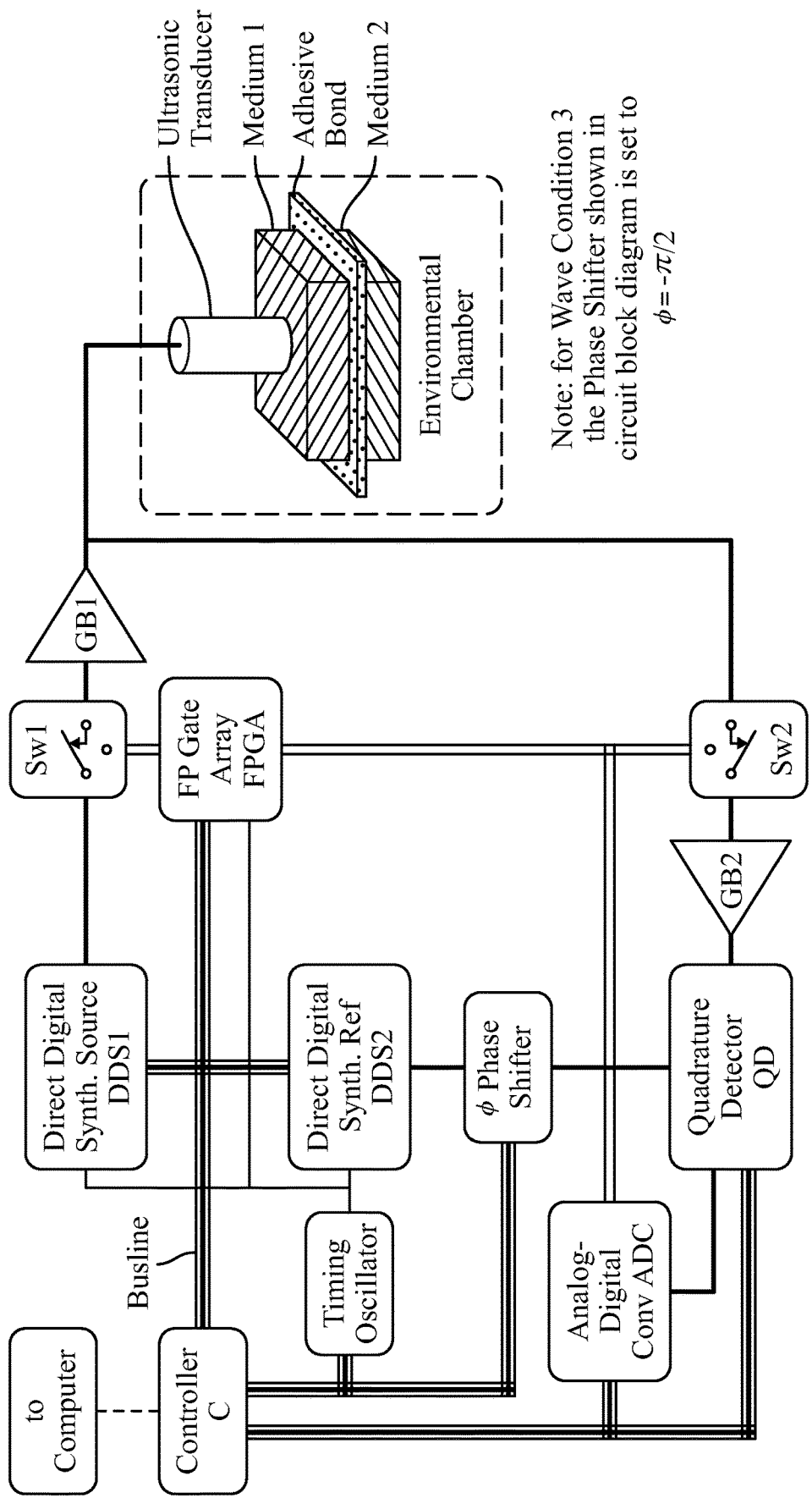
FIG. 1C is a schematic diagram showing another embodiment of an apparatus for ultrasonic testing.

Shown in FIG. 1A is a block diagram of a DPPLL system. The components shown in FIG. 1A are controller (C), two direct digital synthesizers (DDS1 and DDS2), a timing oscillator, an analog-to-digital converter (ADC), a quadrature or phase detector (QD), two solid state switches (Sw1 and Sw2), a field-programmable gate array (FPGA), and gain Blocks GB1 and GB2. Shown in FIG. 1B is a block diagram of another DPPLL system. In FIG. 1B, the components of the DPPLL system are the same except the quadrature or phase detector assembly in FIG. 1A has been replaced with discrete components including a mixer (e.g. a ring bridge) M, and a low-pass filter. Shown in FIG. 1C is a block diagram of another DPPLL system. In FIG. 1C, the components of the DPPLL system are the same except the quadrature or phase detector assembly now has a ø phase shifter permitting arbitrary phase difference matching between an echo signal and a reference signal.

Other systems besides those shown in FIGS. 1A and 1B and 1C can be used as long as such systems can perform a comparison of a reference signal to an echo signal and maintain quadrature or a constant phase difference relation between the reference signal and the echo signals Referring to FIG. 1A, the parameters for ultrasonic measurements may be set up in a computer program in controller C. Controller C (acting as a processor) initializes the system and controls and receives communication from the various components in the DPPLL system which (as shown in this embodiment) are connected through bus lines (identified and depicted as three solid parallel lines in FIG. 1A.) Commands from the controller C direct the measurement sequence, sequence timings, and the operation of each connected block shown. DDS1 is the "source" oscillator, and DDS2 is the "reference" oscillator. The field programmable gate array FPGA may control the timing signals to the solid state switches (Sw1 and Sw2). Each DDS signal output from DDS1 and/or DDS2 is under controller C command, which sets the amplitude, frequency, and phase of each DDS signal. The controller C also controls the synchronizing signals to appropriate components (specifically DDS1 and DDS2) through the timing oscillator, which also provides timing reference for data collection and display. Accordingly, the FPGA (under control by controller C) controls the timing of pulses in order to send a tone-burst sourced by DDS1 into the environmental chamber, and later controls the timing for receiving the electrical output from reflected tone-burst impinging back on the ultrasonic transducer shown in FIG. 1A (acting then as an ultrasonic receiver). The ultrasonic transducer shown in FIG. 1A converts the received echo into an electrical signal. The electrical signal is switched by SW2 which then routes the signal to gain amplifier GB2. Gain amplifier GB2 boosts the signal voltage which is sent to the quadrature detector QD. The amplifier output can also buffered and can be made available for monitoring by an oscilloscope. At the QD, the received amplified tone-burst signal (echo) is phase-compared to the DDS2 reference signal. An analog to digital converter ADC converts analog output signals from quadrature detector QD (i.e., the phase adjustment or the frequency adjustment to maintain quadrature), digitizes the output signals, and sends the value(s) to controller C for both storage and operations.

Consider an ultrasonic wave propagation cavity formed between two reflecting surfaces within a propagating medium under investigation, and whose properties (e.g. propagation speed, attenuation, inhomogeneities, etc.) can be dependent on the cavity thermodynamics (e.g. temperature, stress, pressure, state of all reaction kinetics, curing, etc.). During measurements of the wave medium, an instrument such as the DPPLL system of FIG. 1A can be configured to maintain (i.e. precisely hold constant) the quadrature or phase separation of $\pi/2$ or $3\pi/2$ between the reflected ultrasonic wave (having passed through the cavity twice upon its reflection by the cavity's opposite end) and the reference signal DDS2. The quadrature or phase separation of $\pi/2$ or $3\pi/2$ between the reflected ultrasonic wave and the reference signal DDS2 is maintained by imposing quadrature-causing conditions on the DDS2 reference signal throughout the measurements of the wave medium. During an experimental measurement sequence (such as, for example, the measurement of a reflection coefficient from a reflective interface as a function of a spectral frequency), there may be changes to reference signal frequency or phase. For example, frequency changes to the reference signal may maintain a predetermined phase between the echo signal and the DDS2 reference signal (wave condition 1). Changes in phase to the reference signal may maintain a predetermined phase between the echo signal and the DDS2 reference signal (wave condition 2.) Such changes are measured and tracked as a function of changing tone-bursts frequencies (i.e., spectral frequencies).

Reflected Waveform Characteristics for Interrogation of a Reflection from an Interface Every surface where there is an acoustic impedance difference between media (including the bond-adherend interfaces as well as the adherend-air interface shown in FIG. 1A) causes a reflection. Since each reflection arrives back at the transducer at slightly different times, phase changes exist due to the different travel times with the pressure wave reflected from an adherend-air interface also having been phase shifted by it radians. These waves can add up, especially under conditions caused by reflection overlap. In general, depending on the characteristics of the reflections (partial waves), the resultant reflected wave is considered to be an interference of all the partial waves that arrive back at the same instant.

Figure 1E:
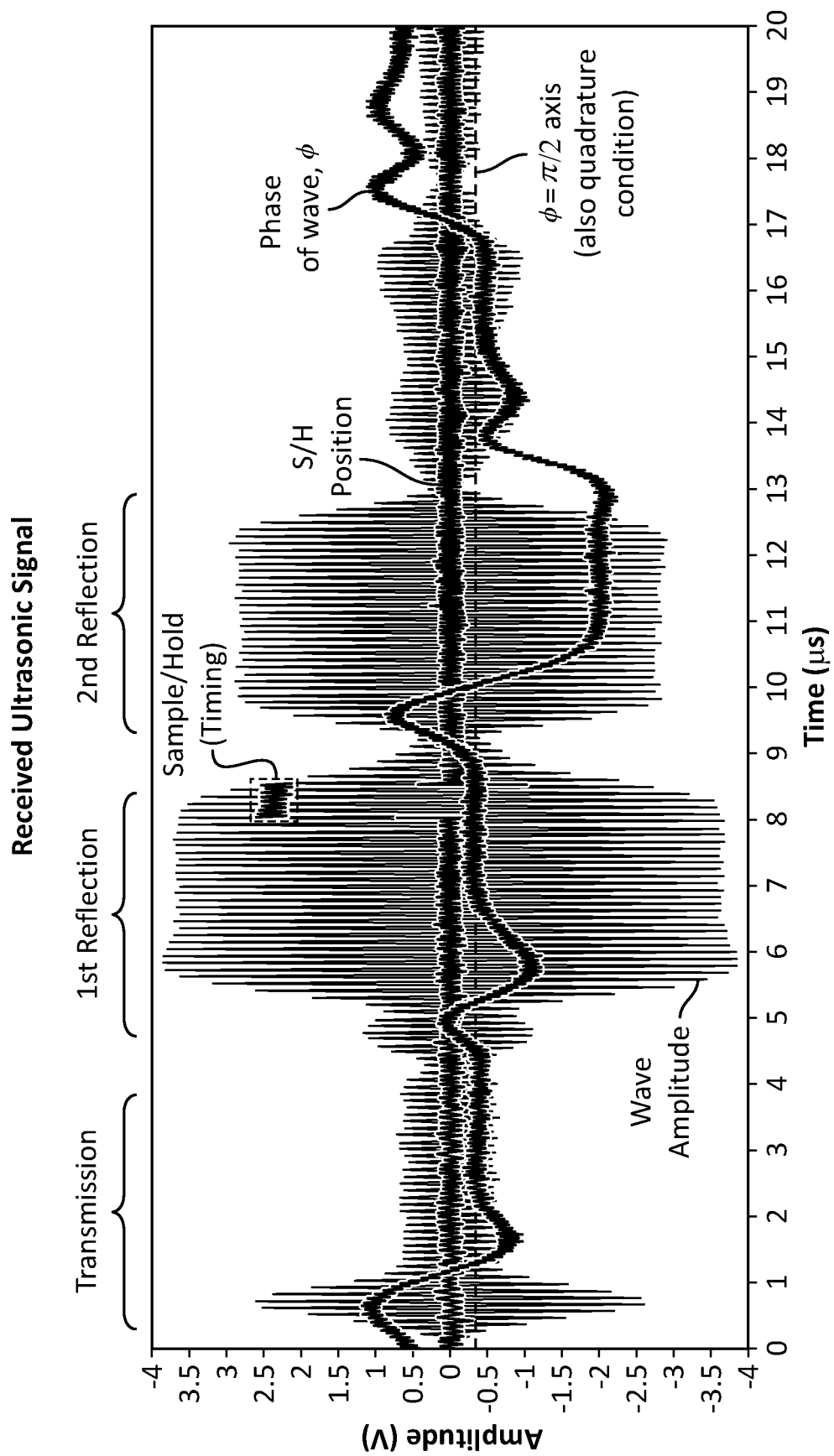
FIG. 1E is a schematic diagram illustrating a reflective amplitude and phase waveforms in FIG. 1D.

FIG. 1D illustrates transmission and round-trip reflection paths (left side) for a specimen in the environmental chamber (top right). The transmission and round-trip reflection paths travel through (and are reflected back at interfaces between) medium 1-adhesive bond-medium 2. (Note that medium 1 and medium 2 could be considered adherents. Note also that, while labeled as an "Adhesive Bond," the present approach is not limited to adhesive materials but can be used to interrogate any kind of interface between two medium that provides for ultrasonic wave reflections, including bonds between different metals, glasses, semiconductors, and polymers, and combinations of these materials.) The transmission and round-trip reflection paths form an interrogation wave path into a specimen or sample, such as medium 1/adhesive bond/medium 2 specimen shown in FIG. 1A. Of typical interest are the major reflections off the medium 2-air interface (or back wall edge). The back and forth reflections are shown as displaced for clarity (in reality, these reflections often fold back on themselves in the same region). The waveform (i.e., the amplitude waveform of the received ultrasonic signal) can be observed on an oscilloscope, and is shown in the diagrams in FIGS. 1D and 1E depicting the amplitude of the received ultrasonic signal as a function of time. The lower right part of FIG. 1D shows an exemplary waveform that can be displayed.

FIG. 1E is an enlarged and labelled view of the lower right part of FIG. 1D. For the sake of illustration, ultrasonic echo signals from the right edge of the first reflection (whose timing could be indicative of reflections from the adhesive bond/medium 2 interface) can selected by switch SW2, forcing the selected portions of the ultrasonic echo signals to the QD detector. This selected region of timing can be considered a sample/hold (S/H) pulse, which marks the location of the phase that is maintained at quadrature by the DPPLL system of FIG. 1A. This selected region of timing denotes a portion of the ultrasonic echo signals representative of a particular reflective interface of interest. Note that, in FIG. 1E, the amplitude abscissa and phase abscissa are slightly offset for the sake of clarity. In the illustration of FIG. 1E, phase locking selects a point at the back edge of the first reflection, as shown by the location of the labelled Sample/Hold pulse. The location of the quadrature condition, forced by the DPPLL system of FIG. 1A to zero directly under the Sample/Hold point, is also noted on FIG. 1E.

Referring back to FIG. 1A, the received tone-burst signal (echo) is received by the DPPLL instrument by the controller closing switch SW2 at an appropriate timing or S/H position. The waveform received back (echo) is phase-compared to the reference DDS2 signal by the quadrature detector QD, the comparison of which is shown in FIG. 1E as an output from QD depicted as the "phase" of the received ultrasonic signal relative to the reference DDS2 signal. The FPGA (under program control by controller C or operator control by way of an oscilloscope trace) selects the sample/hold—S/H—(or timing) location. Accordingly, the S/H (or timing) location is that location (in time) on the echo, which is set by controller C or the operator, for experimental interrogation of a specific reflection interface of interest and whose pulse signal at that point initially is forced to quadrature by a change in the frequency or a change in the phase of the reference DDS2 signal. Afterwards, the system is locked at that S/H (or timing) location and quadrature is set for that S/H (or timing) location. Subsequent variations in the QD measurement (such as for example when the ultrasonic frequency of the tone-bursts is changed) will result in recorded adjustments of the (1) frequency of the reference signal or (2) phase of the reference signal to maintain quadrature or to maintain a predetermined phase difference between echoes from the specific reflection interface of interest and the reference signals.

Stated differently, in one embodiment, the ultrasonic measurement is taken for a selected S/H (or timing) location for a portion of the reflected wave of interest within a sequence of reflections. The locking to that point rejects other reflections or portions thereof, which are not of interest, permitting the operator and/or the DPPLL system to follow the phase character of the reflected interface or the reflected wave of interest as thermodynamics change within the experimental chamber. For example, any change in the propagation conditions (e.g., velocity changes or path length changes) produces an associated phase change in the returned echo signal. This phase change thus contains sample-related information and, hence, is the phase change information sought in the measurement of the bond interface properties described below.

Wave Condition 1

During an experimental measurement sequence in the wave condition 1 embodiment, the frequency is adjusted to keep the number of half wavelengths fixed in the wave medium, and another increment of phase difference may be added for the quadrature condition of $\pi/2$ or $3\pi/2$. In this operational mode, the frequency and phase of a direct digital synthesized source DDS1 signal and a direct digital synthesized DDS2 reference signal are fully synchronized. As shown in FIGS. 1A and 1B, the DDS1 signal, field programmable gate array FPGA, and switch Sw1 generate a tone-burst that is input to an ultrasonic transducer. From the ultrasonic transducer, an ultrasonic wave is broadcast into the cavity. A reflected wave (a cavity echo) is received back from an opposite side of the cavity where the ultrasonic wave was broadcast into the cavity. The phase of the reflected wave relative to the reference signal is measured by quadrature detector QD. Through a feedback loop (e.g., an algorithm stored in controller C), as shown in FIG. 1B, the frequency of the DDS2 reference signal is adjusted to establish and maintain quadrature between the cavity echo and the drive frequency replicated by the DDS2 reference signal. Quadrature detector QD therefore tracks a condition close to (but often not exactly matched to) the cavity resonance condition. As the frequency changes, so do the phase shifts in the electrical components (capacitors, cables, transducers etc.) associated with paths within the DPPLL system and between connections to the cavity. In one embodiment, these types of phase shifts are tabulated for data correction purposes.

Wave Condition 2

During an experimental measurement sequence in the wave condition 2 embodiment, the frequency outputs of the DDS1 signal and DDS2 reference signal are locked to a fixed value, and the phase difference between their outputs is varied to obtain quadrature. This technique holds the wave frequency fixed and measures changes in the wave's phase shift within the wave medium. As above, the DDS1 signal, the FPGA, and the switch Sw1 generate a tone-burst that is input to the ultrasonic transducer to form an ultrasonic wave that is broadcast into the wave medium, and received back upon reflection from the opposite side of the cavity. The phase of the reflection is measured by the QD detector. In this case, the phase of the DDS2 reference signal is adjusted to hold quadrature with the cavity echo by measuring the phase difference between the received back tone-burst, and adding a phase term to maintain quadrature. A feedback loop adjusts the phase to maintain quadrature between the cavity and the phase-shifted DDS2 reference signal. No data correction is required (as in the wave condition 1 embodiment), since the wave condition 2 embodiment has no frequency change-related phase shifts in the DPPLL electronic components that are thermodynamically isolated from the cavity.

Wave Condition 3

In one embodiment (a wave condition 3), the total phase shift (as taken by the instrument in FIG. 1C) can be adjusted for the $n/2$ or $3\pi/2$ shift associated with quadrature, and effectively remove that phase shift from the measurement.

During an experimental measurement sequence in the wave condition 3 embodiment, the frequency outputs of DDS1 and DDS2 are locked to a fixed value for an individual measurement, and the frequency is set near the transducer antiresonance frequency (a quadrature null value). However, in the FIG. 3 configuration, one input provided to the quadrature detector QD in this wave condition is the insertion of an additional fixed phase near $-\pi/2$, as shown in FIG. 1C. This detector arrangement in FIG. 1C identifies the conditions when a physical standing is in resonance within the cavity (the cavity has a length equal to an integral or half-integral number of wavelengths) by the quadrature detector QD outputting a null value. A portion of the reflected wave at resonance is selected, and S/H timing thereof is locked under this condition for subsequent measurement. By increasing the drive amplitude of the input tone-burst at resonance, the cavity acts as an energy reservoir, with increasing wave amplitude adding to the energy reservoir with each wave insertion into the cavity. As the amplitude increases, there are physical changes in the cavity which reveal themselves in shifts in the resonant frequency. The DPPLL instrument records shifts in the cavity's resonant frequency. From these shifts, the effects of various bonding pathologies in the bonds and regional weak spots in the adhesive are observed. The fact is that the bonds are tested by the amplitude increase at resonance. As the amplitude increases, there is a slight change in the cavity's resonant frequency, so slight adjustments in the frequency of the drive signal to maintain the cavity resonance condition. As an indicator of bonded regions beginning to break loose (in a reversible way—meaning that the bonds reform at the removal of the wave energy), the amplitude-frequency change plots reveal regions of somewhat irregular inflections. The DPPLL system of FIG. 1C provides a capability to set physically resonant conditions, where energy can be added to the wave, by increasing the wave amplitude, to obtain various levels of stress at the boundaries between the glue and the adherend. This capability in turn provides for the application of large-amplitude wave analysis techniques, such as nonlinear techniques, which explores actual stress levels at which weak segments of the bond can begin to pull away from the adherend.

Recapitulating, for wave condition 1, the frequency is changed until quadrature between the input waveform to the cavity (from DDS1) and the received waveform output from the cavity (from Sw2) is obtained. The frequency changes are measured, recorded and used for control. For wave condition 2 the phase difference between DDS1 and DDS2 is changed until quadrature is obtained. The phase difference changes are measured, recorded and may be used for control. For either of these cases, when the system is locked, the measurements of frequency change (condition 1) or phase change (condition 2) needed to maintain quadrature are monitored as the thermodynamic conditions are subjected to experimental protocols. Stated another way, after locking, the DPPLL maintains quadrature for the particular wave condition (wave condition 1 or wave condition 2) used in the experimental procedure.

For the wave condition 3, a phase of $\pi/2$ radians is subtracted from the signal going from DDS2 to the QD detector in order for a wave resonance condition within the cavity to be identified by an output null value from the QD detector. The phase is measured, recorded and used for control. The amplitude and number of cycles in the tone-burst are adjusted for a maximum power input to the cavity. In wave resonance conditions, subsequent ultrasonic waves added by the transducer are exactly in step with the waves already being reflected back and forth in the cavity. In other words, this means that the waves are added coherently to the system to build up larger and larger amplitudes of the cavity's waveform. Under special conditions, the tone bursts become long enough to fill the cavity to add even more wave energy, thus creating standing waves of large amplitudes, which are capable of stressing the bonding surfaces. Changes in the physical bond strength under these stressed conditions will manifest themselves in different sound velocities and in a shifting of the resonance conditions.

Accordingly, in one embodiment, a high-resolution ultrasonic phase measurement system (and associated method) can quantifiably measure interfacial adhesive bond strength. In particular, this novel ultrasonic adhesion quality measurement method combines the advantages of frequency-based measurements with phase-based ultrasonic methods.

In one embodiment, this inventive method can be characterized as using a tone-burst from a pulsed single frequency ultrasonic signal and measuring a phase addition at a constant frequency needed to maintain quadrature between an ultrasonic echo signal and a reference signal—rather than using a broadband ultrasonic pulse. In this embodiment, by measuring the ultrasonic phase addition at a single frequency to maintain quadrature and using narrowband filtering to suppress noise, high signal-to-noise ratios and consequently, low phase measurement noise, are obtained even with commercially-available damped transducers. By sweeping the frequency over a desired frequency range and correcting for connecting cable and transducer phase response, a high-resolution ultrasonic phase change vs. frequency spectrum—as opposed to an amplitude vs. time plot—is obtained for characterization of adhesion quality.

In another embodiment, this inventive method can be characterized as using a tone-burst from a pulsed single frequency ultrasonic signal and measuring a frequency change to maintain quadrature between the ultrasonic echo signal and the reference signal—rather than using a broadband ultrasonic pulse. In this embodiment, by measuring the frequency change to maintain quadrature, a phase change between the ultrasonic echo signal and the reference signal can be calculated. By sweeping the frequency over a desired frequency range and correcting for instrumental frequency responses, a high-resolution ultrasonic phase change vs. frequency spectrum is obtained for characterization of adhesion quality.

Figure 1F:
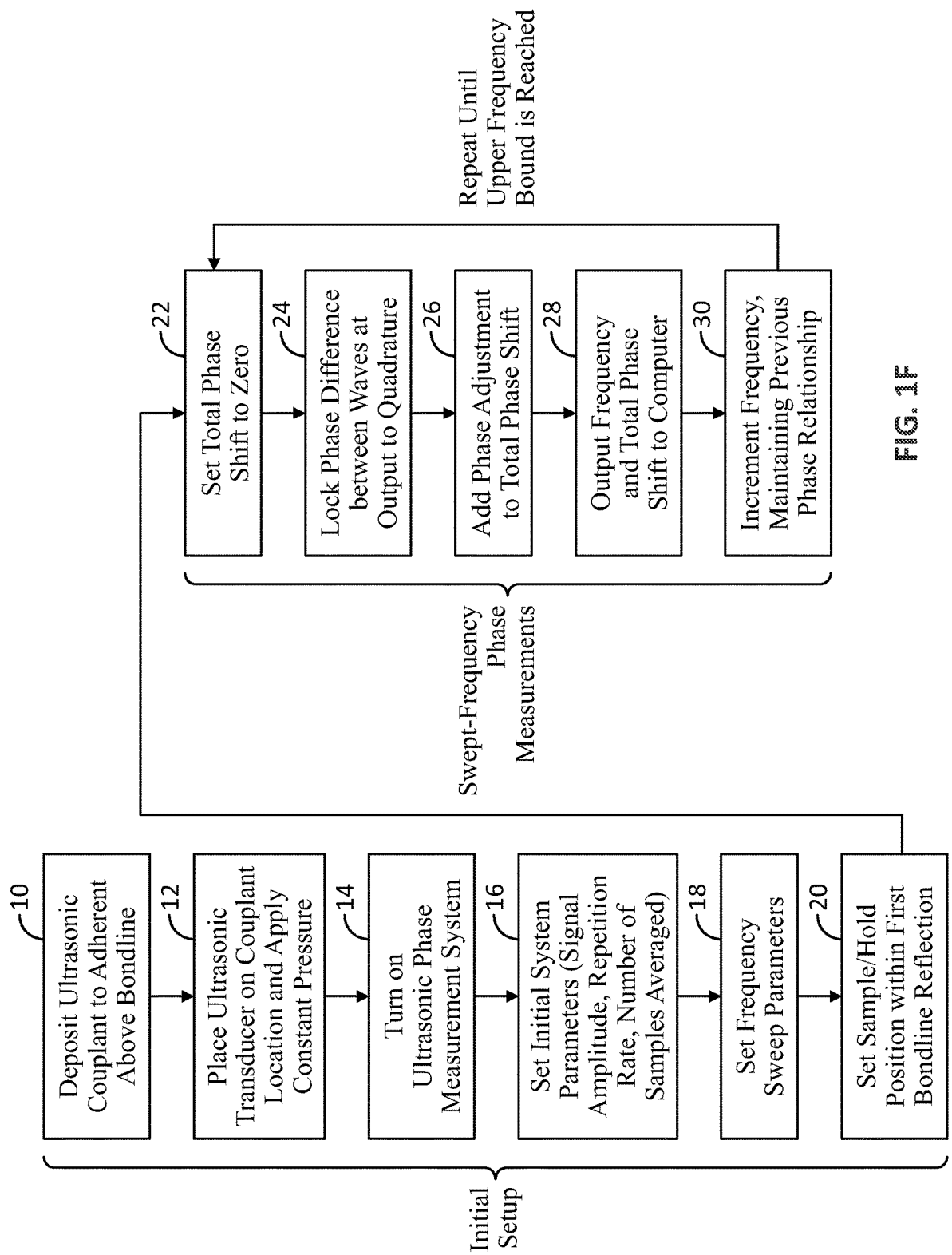
FIG. 1F is a schematic diagram showing one method embodiment for ultrasonic testing.

As an example of the setup and measurement procedure, FIG. 1F is a schematic diagram showing one method for ultrasonic testing of adhesive bond strength. More specifically, FIG. 1F shows a flow chart of how ultrasonic phase measurements can be recorded for a bonded joint. As shown in FIG. 1F, at step 10, an ultrasonic couplant is deposited to an adherent above a bondline. The couplant can be any conventional gel material permitting ultrasonic energy to be coupled from an ultrasonic transducer into the adherent. (Typically, a relatively thin layer of coupling materials ranging from oils, high vacuum grease, bee's honey, water or water-based gels, even glues and silicones is used.) At step 12, the ultrasonic transducer is placed onto couplant and preferably a constant pressure is applied or maintained. At step 14, the ultrasonic phase measurement begins. At step 16, the initial measurement parameters are set such as for example ultrasonic signal amplitude, repetition rate, number of samples to the averaged, etc. At step 18, frequency sweep parameters are set. At step 20, the x-y location on the bondline is determined, and the sample hold position is adjusted. At step 22, the total phase shift is set to zero. At step 24, the phase difference between waves at output to quadrature is locked. At step 26, a phase adjustment is added to the total phase shift to compensate for the phase difference of the echo wave. Alternatively, at step 26, a frequency adjustment can be made to compensate for the phase difference of the echo wave. As noted above, from the frequency adjustment for quadrature, a phase shift can be calculated between the reference signal and the echo signal. At step 28, the frequency of the tone-bursts vs. phase shift is output to a computer (such as for example controller C in FIGS. 1A and 1B) to obtain a spectrum of phase difference versus frequency. At step 30, the frequency is incremented while maintaining previous phase relationship of step 26. Steps 22 through 30 comprise a frequency sweep with incremental phase adjustments.

Narrow band-pass filtering using matched narrow band-pass filters may be used to remove extraneous frequencies, which permits for much lower phase measurement uncertainty than other methods, combined with digital sine wave generation, which permits better phase measurement resolution. Narrow band-pass filtration permits the passage of frequencies as designed by the filters. Physical filters made from matched electronic components can be used. If latency in the digital system is not a problem, digital filtering can be used. In either case, the filter design introduces a frequency-dependent phase shift. In general, measurements of instrument-based phase shifts for a range of frequencies can be used to correct for instrumental-dependent phase shifts. When using the DPPLL system in a constant frequency mode (variable phase), these problems can be avoided. But, as noted above, this instrument can be used in a constant phase mode (variable frequency) when the data is expressed as a function of frequency.

The ultrasonic transducers themselves can act like band-pass filters, in that the phase relationship between the acoustic wave impinging on the transducer and the voltage-current transducer output depends upon a number of factors related to the transducer properties. The major factor is the transducer thickness, which is at acoustic resonance when the thickness in ½ wavelength in the transducer material. The Q of the transducer-specimen complex also is a factor. With the DPPLL systems described above, the effects from weak bonding typically overshadow these instrument effects.

Analysis

Since a linear correlation is expected to exist between interfacial stiffness constants and mechanically-measured interfacial bond strength, in one embodiment, an ultrasonic phase measurement method identifies intermediate bond strengths, rather than simply detecting good or bad bonds. Indeed, the present inventors have found that, near the ultrasonic resonance frequency, the phase of ultrasonic bondline reflections undergoes a sharp inversion from negative to positive values, in this case crossing zero at the anti-resonance condition. Normally, the sharpness of the inversion only depends on the acoustic attenuation coefficient of the adhesive. However, weak bonding at the adhesive/adherent interfaces causes (1) a shift of the anti-resonance frequency and (2) a change in the "sharpness" or slope of the phase inversion as a function of frequency. These characteristics are understandable from the analysis below.

Starting with a quasi-static model for ultrasonic interactions with imperfect interfaces similar to that developed by Baik and Thompson, described in "Ultrasonic Scattering from Imperfect Interfaces: A Quasi-Static Model," Journal of Nondestructive Evaluation, vol. 4, no. 3/4, pp. 177-196, 1984, the present inventors have analyzed in particular normal-incidence particle displacement wave reflection coefficient from imperfect bonding within an adhesive single lap joint (SLJ). In this analysis, an ultrasonic displacement plane wave is excited into the bondline at a normal incidence, represented by Equation 1, where $T_i$ is the wave amplitude $i=\sqrt{-1}$, $\omega$ is angular frequency, t is time, k1 is the complex wavenumber in the incident medium, and x is the distance travelled by the wave.

$$u_i(x,t) = T\ i\ e^{(i\omega t - k1x)} \quad [\text{Eq. 1}]$$

Figure 2:
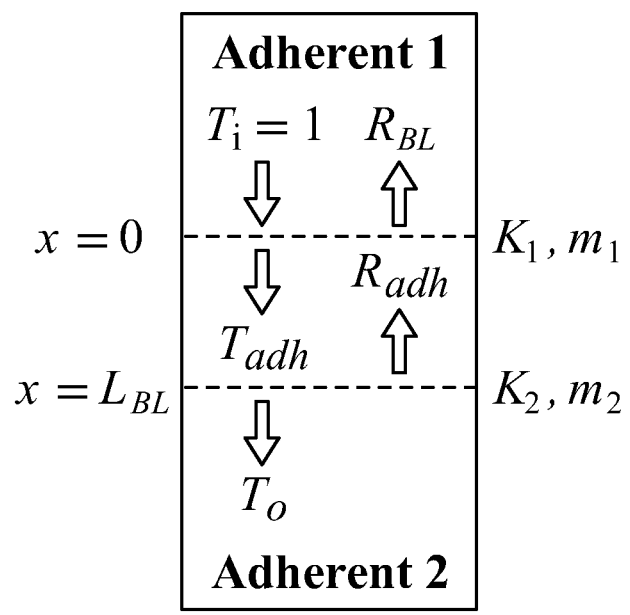
FIG. 2 is a simplified schematic of a single lap joint showing the ultrasonic characteristics.

FIG. 2 is a simplified schematic of a single lap joint showing the ultrasonic characteristics. Using the SLJ configuration in FIG. 2, the incident ultrasonic plane wave amplitude transmitted into the bondline, $T_i$, is assumed to be unity for simplicity. Adhesive bond strength can be represented by a distributed mass-spring system, with a stiffness per unit area constant $K_n$ and mass per unit area $m_n$ at each adhesive/adherent interface. In FIG. 2, x is the distance from the first adherent interface, $L_{BL}$ is the bondline thickness, $R_{adh}$ and $T_{adh}$ are respectively the reflection and transmission coefficients within the adhesive, To is the ultrasonic transmission coefficient through the bondline, and $R_{BL}$ is the bondline reflection coefficient. The reflected particle displacement waves within the bondline are separated by a time-of-flight (ToF) of $2L_{BL}/c_{adh}$, where $c_{adh}$ is the sound velocity within the adhesive. Assuming the adhesive ToF is small with respect to the incident tone-burst duration, the net effect of multiple decaying reflections within the bondline is considered.

The ultrasonic reflection coefficient of the tri-layer structure with two imperfect interfaces can be found by applying the appropriate boundary conditions at each interface and simultaneously solving coupled equations for the bondline particle displacement wave reflection coefficient, $R_{BL}$. FIG. 3 shows a table of the assumed ultrasonic displacement and stress equations in each medium of FIG. 2 as a function of position x. For clarity, the time dependence portion of the equations is omitted throughout this derivation. The ultrasonic stress is found from the displacement equations from the relation, $\sigma = E\ \partial u / \partial x$, where u is ultrasonic displacement, x is position, $\sigma$ is stress, and E is the longitudinal elastic modulus. The longitudinal elastic modulus used here is defined as $E = \lambda + 2G = \rho c_2$, where $\lambda$ is Lamé's first parameter, G is the shear modulus, p is the mass density, and c is the sound velocity within the medium.

In the table of FIG. 3, $k_n = i\omega/c_n + \alpha_n$ is the complex ultrasonic wavenumber in each medium given input angular frequency $\omega$, sound velocity $c_n$, and acoustic attenuation coefficient $\alpha_n$; and $E_n = \rho_n c_n^2$ is the longitudinal elastic modulus in each medium given mass density $\rho_n$ and sound velocity. While the attenuation coefficient is nominally frequency dependent, it is assumed constant in this work, as small frequency ranges are used. The imperfect interface boundary conditions from Baik and Thompson (described above) are applied to each interface; the results are given in the table of FIG. 4.

After applying each of the four boundary conditions in FIG. 4 to the displacement and stress equations from the table of FIG. 3, the resulting system of equations was solved to find a closed form solution for the bondline reflection coefficient, $R_{BL}$. After simplification, the bondline reflection coefficient is displayed as an equation in FIG. 5.

While the general reflection coefficient $R_{BL}$ given in the equation in FIG. 5 is useful in modeling the theoretical ultrasonic amplitude or phase response of nearly any given SLJ material system, the complexity of the reflection coefficient is simplified in many common situations. In most bonding situations, the same material is used for both upper and lower adherent, so the elastic constant and wavenumbers are equal in the adherents. Second, for weak bonds with a thin layer of contamination without large voids or porosity, mass-loading at the interfaces is negligible, and thus m is zero. However, note that both interfacial stiffness constants are not equal, because in actually-occurring scenarios one adherent may be more contaminated than the other, which results in different interfacial bond strengths. Therefore, the bondline ultrasonic reflection coefficient in FIG. 6 accounts for different interfacial bond strengths.

Figure 7:
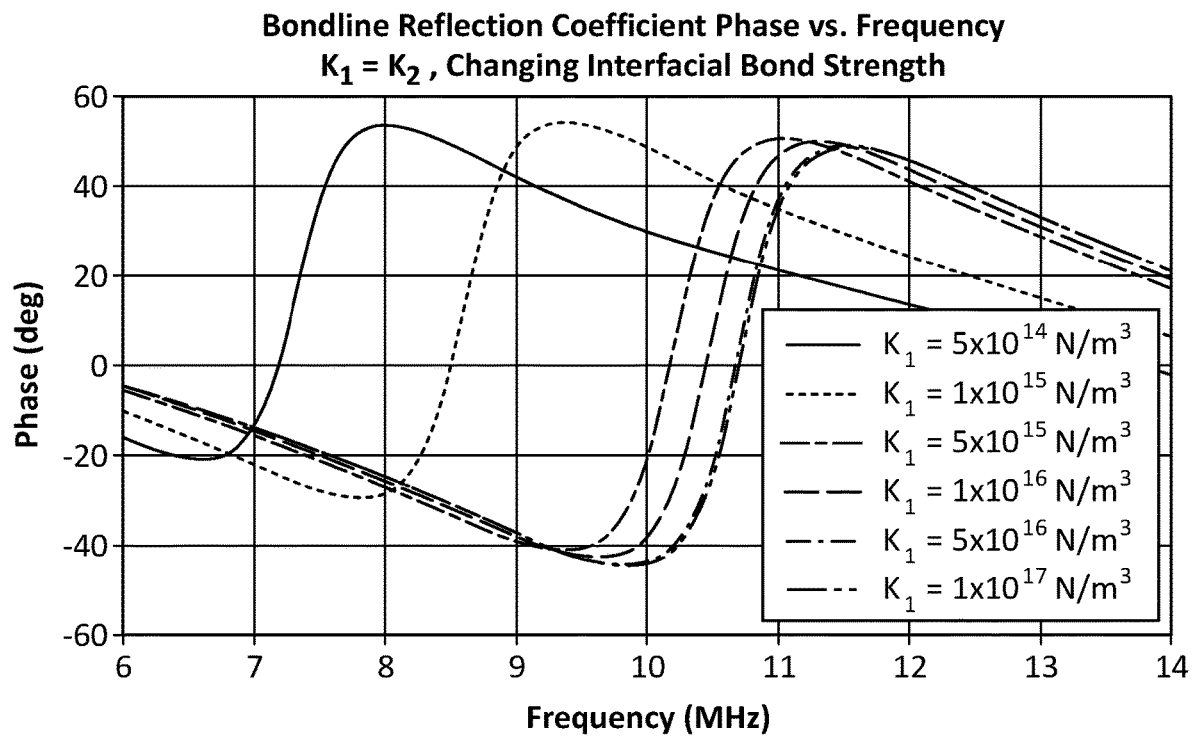
FIG. 7 is a graphical plot of the bondline reflection coefficient phase versus frequency for similar materials across the bondline having varying degrees of bond strength K.
Figure 8:
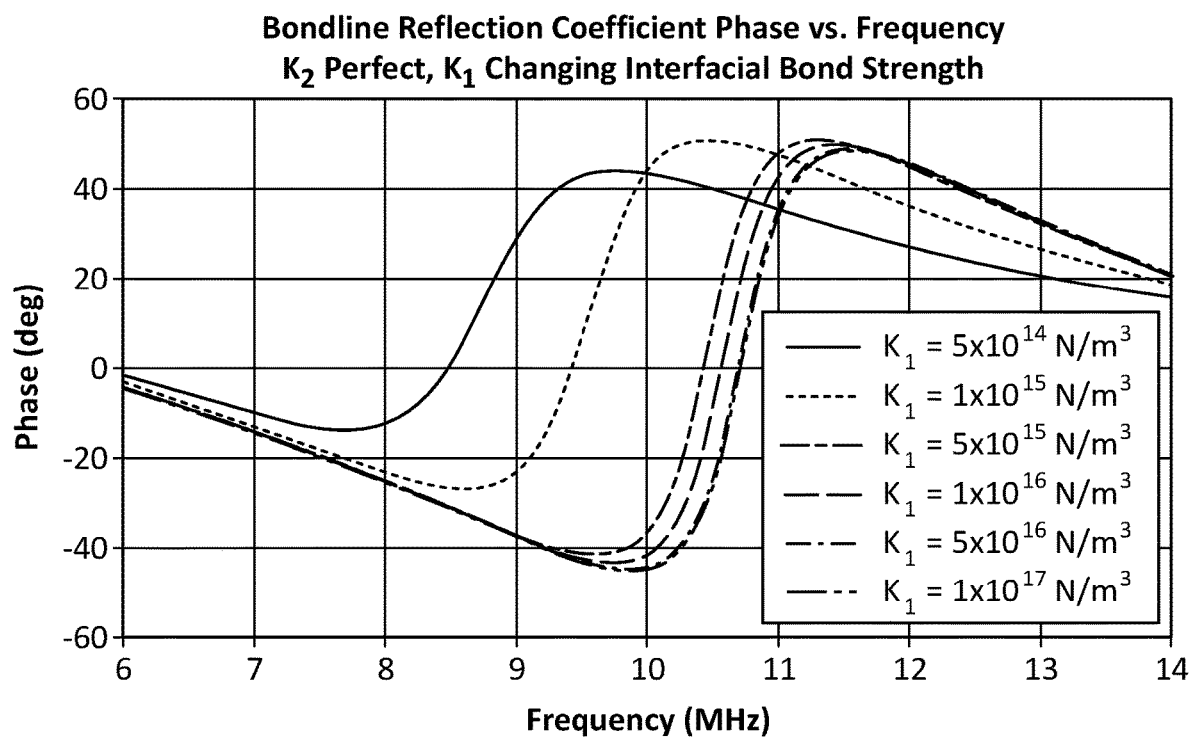
FIG. 8 is a graphical plot of the bondline reflection coefficient phase versus frequency for different materials across the bondline having varying degrees of bond strength $K_1$.

Analysis of the reflection coefficient shows how bond quality affects the zero-crossing frequency of the phase response and the slope of phase shift at the zero crossing-frequency. FIG. 7 shows the phase response of a typical 100 µm thick aluminum/epoxy single lap joint, where the interfacial stiffness is the same at both adhesive/adherent interfaces. In this case, a low interfacial stiffness K drops the resonance and zero-crossing frequency, but it has little effect on the slope of phase shift. In contrast, FIG. 8 shows the phase response from the same bonded joint setup, but the interfacial stiffness constants K1 and K2 are different on each side of the bondline. This result shows a difference in interfacial stiffness constants causes a measurable effect on the "sharpness" of phase inversion in addition to shifting the zero-crossing frequency. By measuring the phase zero crossing frequency and the phase slope at the zero crossing, an inverse algorithm can determine a single lap joint's interfacial stiffness constants, and thereby predict the interfacial bond strengths.

Measurement Considerations

Figure 9:
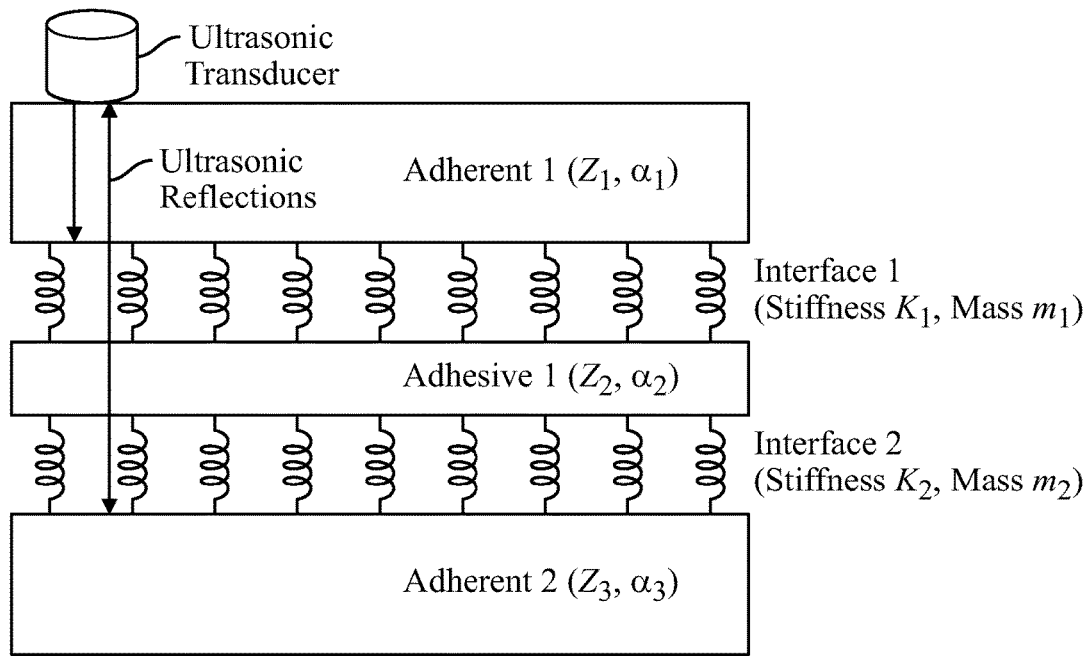
FIG. 9 is a schematic depiction of an ultrasonic wave and its producing an ultrasonic reflection at an adhesive interface holding two glass slides together.
Figure 10:
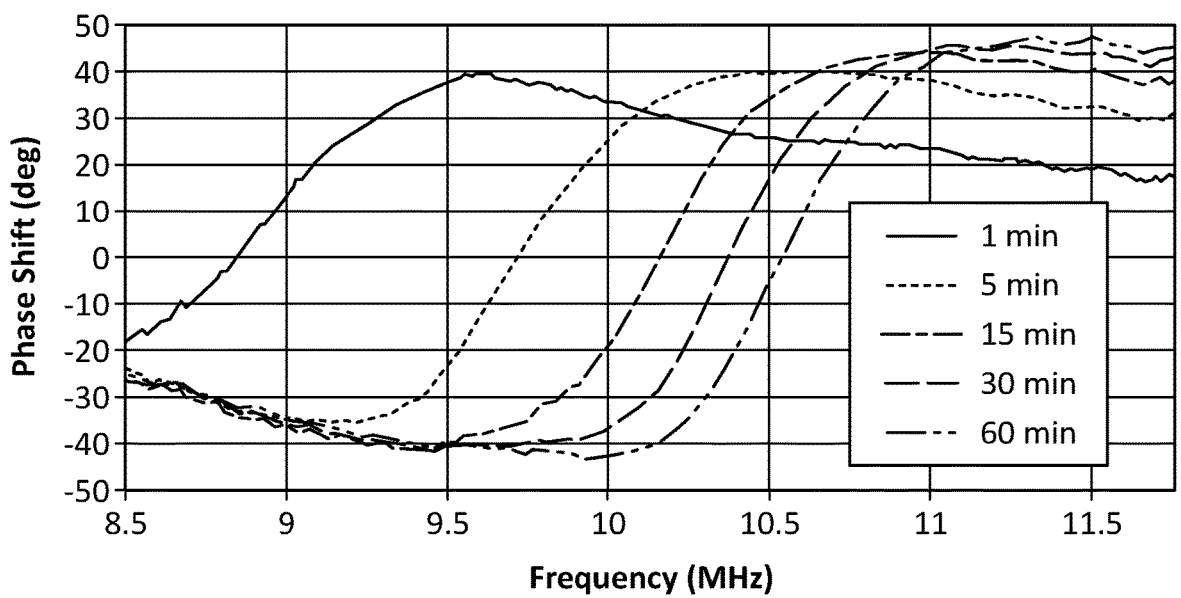
FIG. 10 is a schematic display of measured phase vs. frequency responses from bondline reflections in a glass/UV-curable adhesive joint.

To illuminate the application of the model, consider an embodiment where adherents are optically transparent even into the near-ultraviolet (UV) range. In this embodiment, a bond of variable strength by using glass adherents and an adhesive where bonding is controlled by degree of UV light exposure. The adhesive bonds in these joints were ultrasonically evaluated with the swept-frequency phase measurement method described above and then were mechanically pull-tested to find tensile strengths. FIG. 9 is a diagram of a typical measurement setup for this technique. FIG. 10 displays several measured phase vs. frequency responses from bondline reflections in the glass/UV-curable adhesive joint as a function of time for the UV light curing. FIG. 10 shows the capability to monitor the development of adhesion during a curing process. While illustrated above for a photocurable adhesive, the present approach is not so limited and could measure other adhesive systems as they cure such as for example water-based, catalytic-based, and pressure-based adhesives.

In this case, an adhesive was used in which the state of cure directly depended on the cumulative exposure to UV light. The manufacturer of the adhesive provided this dependency and the conditions necessary to obtain the state of cure. Transparent specimens were used to propagate the UV light to the interface.

During the progression of the curing process, the areal density of bond number increases, which increases the bonding strength across the materials that are bonded. As this occurs, the sound speed across the bond increases in step with the strengthening. This causes a change in the resonance condition, which causes a frequency shift in the pulsed phase-locked loop. As the temperature or the pressure to the bond is changed, the curing dynamics are affected, but mainly in this case, the bonding dynamics is affected by changing exposure to UV light.

Figure 11:
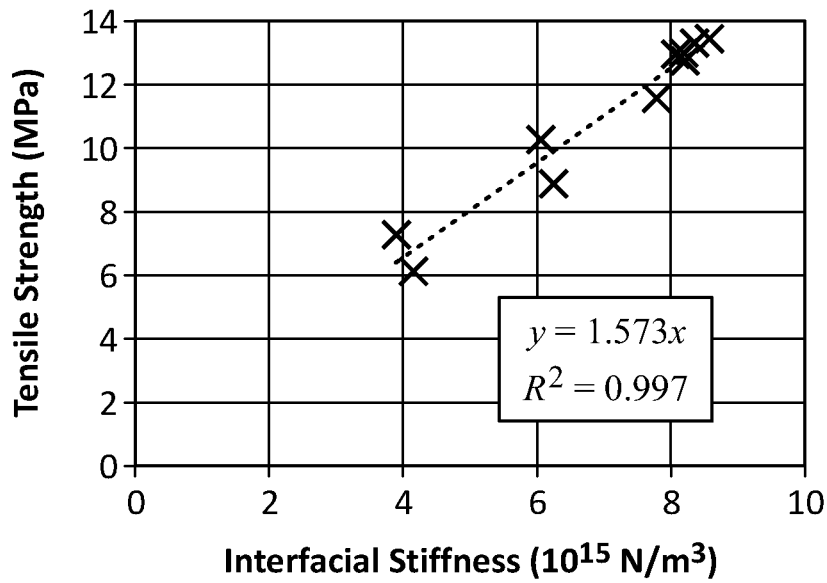
FIG. 11 is a depiction of a linear fit of experimental tensile strength (destructively measured) vs. interfacial stiffness (non-destructively measured using the inventive method)

The linear fit of the experimental tensile strength vs. interfacial stiffness from this work shows that a linear relationship holds true, as seen in FIG. 11. There are many pathogenic factors that may creep into the bond to affect its quality. The technology outlined here is sensitive to weakened regions within a bond or its adhesive, for whatever the causal factors. As the weakening occurs, the frequency responsiveness to the resonance condition (measured with this instrument) spreads out. In physical and electrical engineering terms, the "Q" decreases. A low "Q" implies a weak bond. A mathematical model of the bond's acoustic parameters to areal density of chemical bonds between the adhesive and the adherents permits the response of the instrument to be correlated to the bond state, and hence overall quality of the bond.

The strong correlation shown in FIG. 11 between ultrasonically-measured interfacial stiffness and the destructively measured mechanical bond strength shows that the inventive swept-frequency phase measurement technique has sufficient sensitivity to predict interfacial bond quality.

Figure 12A:
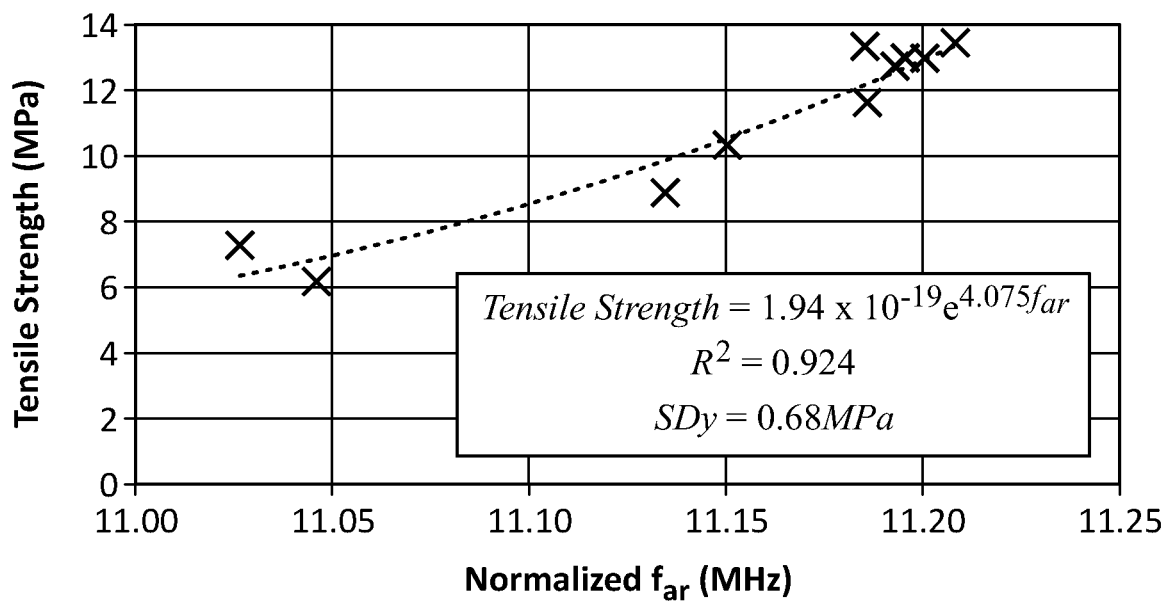
FIG. 12A is a depiction of tensile strength vs. the anti-resonance frequency of each joint after normalization for sound velocity and thickness.

Without fitting measured phase data to material parameters, the resonance frequency is directly related to tensile strength. The anti-resonance frequency is defined herein as the zero-crossing frequency of the bondline phase response. FIG. 12A displays the tensile strength vs. the anti-resonance frequency of each joint after normalization for sound velocity and thickness. In FIG. 12A, a strong exponential correlation between a) the tensile strength measured destructively and b) the normalized anti-resonance frequency is observed, with a tensile strength prediction standard deviation of +/−0.23 MPa or 2.27 atm. The measurements shown in FIG. 12A indicate that the interfacial bond strength can be predicted by the zero-crossing frequency of the ultrasonic phase response of a bonded joint.

Computer Implementation

Figure 12B:
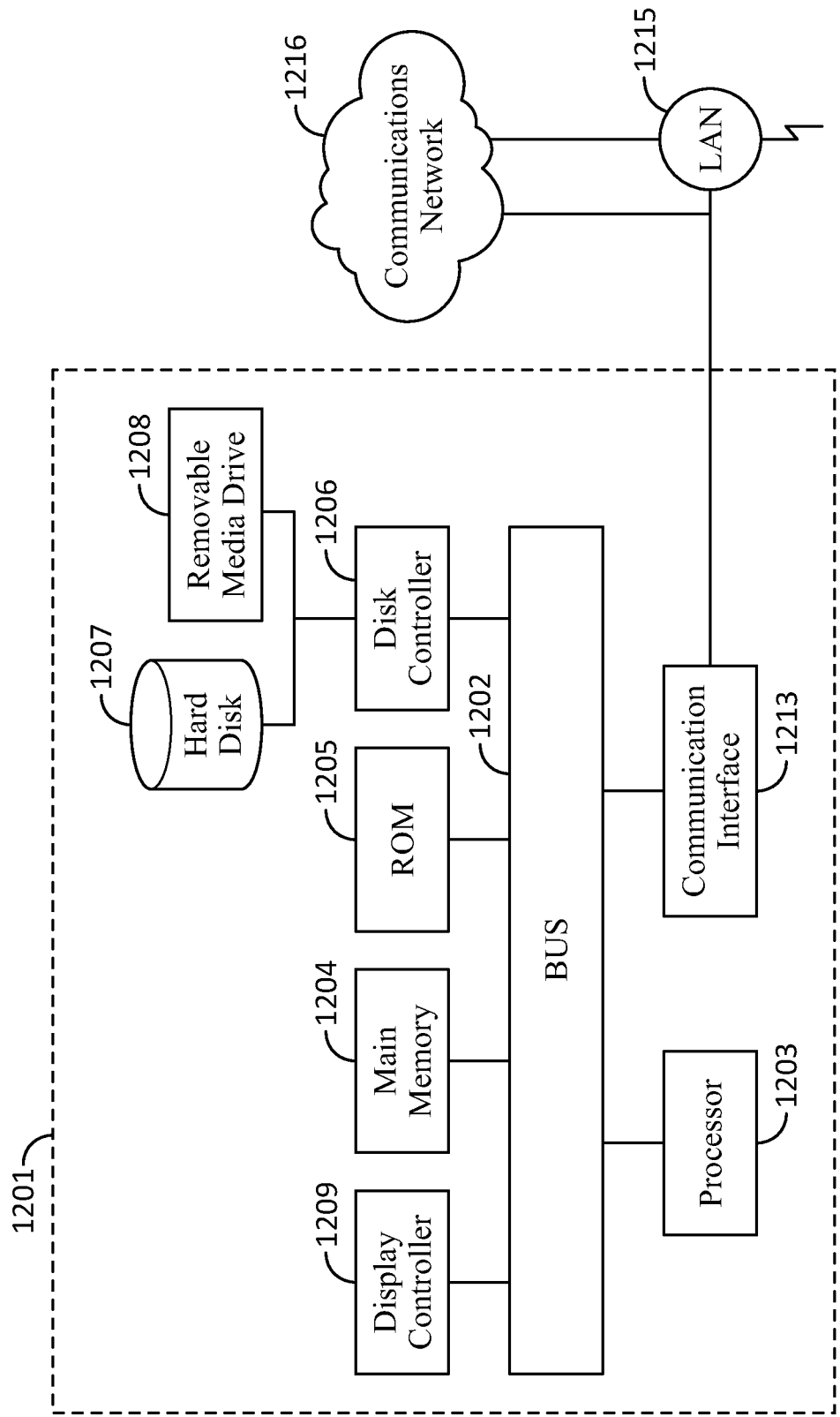
FIG. 12B is a depiction of a computer system for implementing various embodiments related to non-destructively testing of adhesive interfaces.

FIG. 12B illustrates a computer system 1201 for implementing various embodiments of this approach related to non-destructively testing of adhesive interfaces. In particular, computer system 1201 may be used as controller C in FIGS. 1A, 1B, and 1C to perform any or all of the functions described above, including some or all of the steps described in FIG. 1F and described in the appended claims. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable read only memory (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display for displaying information to a computer user. The computer system includes input devices, such as a keyboard and a pointing device, for interacting with a computer user and providing information to the processor 1203. The pointing device, for example, may be a mouse, a trackball, or a pointing stick for communicating direction information and command selections to the processor 1203 and for controlling cursor movement on the display to a user of the phantom device.

The computer system 1201 performs a portion or all of the processing steps of the present approach (such as for example those described in relation to FIG. 1F and including in memory algorithms incorporating the reflection coefficient solutions shown in FIGS. 5 and 6). The computer system 1201 performs such processing steps in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of this approach and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, embodiments of this approach may include software for controlling the computer system 1201, for driving a device or devices for implementing aspects of the invention, and for enabling the computer system 1201 to interact with a human user. Such software may include, but is not limited to, device drivers, operating systems, development tools, and applications software. Such computer readable media further includes a computer program product for performing all or a portion (if processing is distributed) of the processing performed in implementing the approach.

The computer code devices of embodiments may be any interpretable or executable code mechanism, including but not limited to scripts, interpretable programs, dynamic link libraries (DLLs), Java classes, and complete executable programs. Moreover, parts of the processing of the invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the invention remotely into a dynamic memory and send the instructions. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214, and the communication interface 1213.

Applications

For single lap joints in general, interfacial bond strength can be measured from the zero-crossing frequency and the slope at the zero-crossing frequency of the phase vs. frequency response of an ultrasonic reflection from the bondline.

For single lap joints where both adhesive/adherent interfaces are of the same quality, interfacial bond strength can be measured by the zero-crossing frequency of the phase vs. frequency response of an ultrasonic reflection from the bondline.

To reduce error due to lack of adherent parallelism in single lap joints or adherents with high acoustic attenuation, frequencies well below the zero crossing or resonance of the phase vs. frequency response of an ultrasonic reflection from the bondline can be used. In this case, interfacial bond strength can be measured by the slope and y-intercept of the line-of-best-fit of the phase vs. frequency response of an ultrasonic reflection from the bondline.

The difference in bond quality of the two adhesive/adherent interfaces can be measured by the slope of at the zero-crossing frequency of the phase vs. frequency response of an ultrasonic reflection from the bondline.

While the prior ultrasonic methods have used the interfacial spring model, the amplitude vs. frequency response of a bonded joint as shown in and the phase of a broadband pulse to measure interfacial stiffness constants are insufficiently sensitive. By contrast, with the present inventive systems and methods, the phase vs. frequency response of a bonded joint can be used to measure interfacial stiffness constants and to predict bond strength, as demonstrated above. While other prior methods looked at the amplitude and time-delay of a broadband ultrasonic pulse, the inventive method utilizes a constant-frequency ultrasonic tone-burst.

In this inventive method, phase measurements are obtained at a single frequency (the tone burst) and then swept to obtain measurements at other frequencies. In other words, the measurement of ultrasonic phase at a constant frequency is combined with high-resolution swept-frequency phase measurement technology to evaluate adhesive bond strength. Narrowband filtering is used to remove extraneous frequencies, which permits for much lower phase measurement uncertainty than other methods, combined with digital sine wave generation, which allows for better phase measurement resolution. Thus, the inventive system and methods described herein have superior sensitivity to bond quality compared to prior art non-destructive methods.

This method of direct phase vs. frequency measurement permits extraction of the relevant phase response parameters, including the slope at the zero-crossing frequency. From these results, interfacial stiffness constants and the consequent bond strengths can be obtained, as demonstrated above.

The demonstrated ultrasonic phase method described above is applicable to a variety of bonding material systems. For example, this inventive technique can verify bond quality in metal and composite joint systems, including those commonly found in aerospace, automotive, and many other transportation and infrastructure designs, as further discussed below.

Essentially any industry that uses adhesive bonding for structural support would be interesting in the inventive technology to nondestructively measure adhesive bond strength. In the aerospace industry, airplane manufacturers could use the inventive methods for ensuring adequate bond strength for their parts after fabrication and after bonded repairs.

In the automotive industry, the large car manufacturers such as GM, Ford, etc. would be interested, as they are beginning to use more composite structures and adhesive bonding in their cars. For example, Ford's recent F-150 trucks are now using a fully-aluminum body held together with adhesive bonds. A bond strength assessment method would provide another quality assurance method by which to evaluate critical adhesive joints prior to cars and trucks leaving the factory. The auto-body repair market would likewise be able to use this invention.

Another industry suitable for this invention is the medical and dental bonding industry. For example, a method for bond strength evaluation could be helpful for companies researching new adhesives for dental bonding under moist conditions.

Numerous modifications and variations of the invention are possible in light of the above teachings. It is therefore to be understood that within the scope of the appended claims, the invention may be practiced otherwise than as specifically described herein.

What is claimed is:

1. A method for ultrasonic testing of adhesion, comprising:
    generating a first burst of ultrasonic waves at a first frequency for a first predetermined duration;
    supplying the first burst into a sample having an interface which reflects the ultrasonic waves;
    measuring a first echo of the ultrasonic waves from the interface;
    maintaining a predetermined phase difference between the first echo returned from the sample and a first reference signal representative of the first burst supplied to the sample;
    generating a second burst of ultrasonic waves at a second frequency for a second predetermined duration, wherein the second frequency is incremented from the first frequency;
    supplying the second burst into a sample;
    measuring a second echo of the ultrasonic waves from the interface;
    maintaining the predetermined phase difference between the second echo returned from the sample and a second reference signal representative of the second burst supplied to the sample; and
    providing bursts of respective different frequencies to the sample and continuing to maintain the predetermined phase difference between echoes returned from the sample and representative reference signals of the bursts provided to the sample until a spectrum of a phase of ultrasonic wave reflection at the interface versus frequency is obtainable.

2. The method of claim 1, wherein quadrature between echoes returned from the sample and representative reference signals is maintained by frequency adjustments of the respective different frequencies until the predetermined phase difference between the echoes returned from the sample and the representative reference signals is obtained, and calculating respective phases of the ultrasonic wave reflection based on the frequency adjustments made at different frequencies in the spectrum to maintain the quadrature.

3. The method of claim 1, wherein quadrature between echoes returned from the sample and representative reference signals is maintained by respective phase additions to the representative reference signals until the predetermined phase difference between the echoes returned from the sample and the representative reference signals is obtained, and calculating the phase of the ultrasonic wave reflection based on the phase additions made at fixed frequency in the spectrum to maintain the quadrature.

4. The method of claim 1, wherein
timing from a respective echo returned from the sample is used to identify a portion of the echo signal attributed to a reflection from the interface,
the timing is locked, and
as the frequencies of the bursts are changed, adjustments made to maintain the predetermined phase difference between echoes returned from the sample and representative reference signals of the bursts are recorded for production of the spectrum.

5. The method of claim 1, further comprising correcting for instrumental frequency responses when obtaining the spectrum.

6. The method of claim 1, further comprising calculating from the spectrum an anti-resonance frequency where the phase difference measured as a function of frequency crosses zero.

7. The method of claim 6, further comprising calculating from the spectrum a tensile strength of an adherent at the interface based on the anti-resonance frequency.

8. The method of claim 1, further comprising calculating a tensile strength of an adherent based on a single lap joint model for the interface.

9. The method of claim 8, wherein the tensile strength of the adherent is calculated from a measured bondline reflection coefficient $R_{BL}$.

10. The method of claim 9, wherein the bondline reflection coefficient $R_{BL}$ for the single lap joint model comprises:

$$R_{BL} \approx \frac{C_N \cosh(k_{adh} L_{BL}) + S_N \sinh(k_{adh} L_{BL})}{C_D \cosh(k_{adh} L_{BL}) + S_D \sinh(k_{adh} L_{BL})}$$

$$C_N = (E_1 k_1 E_{adh} k_{adh}) \left[ \frac{E_1 k_1}{\left(K_1^{-1} + K_2^{-1}\right)^{-1}} \right]$$

$$C_D = (E_1 k_1 E_{adh} k_{adh}) \left[ 2 + \frac{E_1 k_1}{\left(K_1^{-1} + K_2^{-1}\right)^{-1}} \right]$$

$$S_N = \left(E_1^2 k_1^2 - E_{adh}^2 k_{adh}^2\right) + E_1 k_1 E_{adh}^2 k_{adh}^2 \left( \frac{1}{\left(K_1^{-1} - K_2^{-1}\right)^{-1}} + \frac{E_1 k_1}{K_1 K_2} \right)$$

$$S_D = \left(E_1^2 k_1^2 + E_{adh}^2 k_{adh}^2\right) + E_1 k_1 E_{adh}^2 k_{adh}^2 \left( \frac{1}{\left(K_1^{-1} + K_2^{-1}\right)^{-1}} + \frac{E_1 k_1}{K_1 K_2} \right).$$

11. A system for ultrasonic testing of adhesion, comprising
a) an ultrasonic wave generator configured to generate a first burst of ultrasonic waves at a first frequency for a first predetermined duration,
b) an ultrasonic transducer configured to deliver the first burst into a sample having an interface which reflects the ultrasonic waves,
c) an ultrasonic wave detector configured to measure a first echo of the ultrasonic waves from the interface, and
d) a processor configured to maintain a predetermined phase difference between the first echo returned from the sample and a first reference signal representative of the first burst supplied to the sample at a predetermined phase difference, wherein
the ultrasonic wave generator is further configured to generate a second burst of ultrasonic waves at a second frequency for a second predetermined duration, wherein the second frequency is incremented from the first frequency,
the ultrasonic transducer is further configured to deliver the second burst into a sample,
the ultrasonic wave detector is further configured to measure a second echo of the ultrasonic waves from the interface,
the processor is further configured to maintain the predetermined phase difference between the second echo returned from the sample and a second reference signal representative of the second burst supplied to the sample, and
the ultrasonic wave generator, the ultrasonic transducer, and the ultrasonic wave detector are configured to provide bursts of different frequencies to the sample and to continue to maintain the predetermined phase difference between echoes returned from the sample and representative reference signals of the bursts supplied to the sample until the processor obtains a spectrum of a phase of an ultrasonic wave reflection at the interface versus frequency.

12. The system of claim 11, wherein quadrature between echoes returned from the sample and representative reference signals is maintained by frequency adjustments to the respective different frequencies until the predetermined phase difference between the echoes returned from the sample and the representative reference signals is obtained, and the processor calculates respective phases of the ultrasonic wave reflection based on the frequency adjustments made at different frequencies in the spectrum to maintain the quadrature.

13. The system of claim 11, wherein quadrature between echoes returned from the sample and representative reference signals is maintained at a constant frequency operation by respective phase additions to the representative reference signals until the predetermined phase difference between the echoes returned from the sample and the representative reference signals is obtained, and the processor calculates respective phases of the ultrasonic wave reflection based on the phase additions made at fixed frequency in the spectrum to maintain the quadrature.

14. The system of claim 11, wherein the processor is configured to:
use timing from a respective echo returned from the sample to identify a portion of the echo signal attributed to a reflection from the interface,
lock the timing, and
as the frequencies of the bursts are changed, record adjustments made to maintain the predetermined phase difference between echoes returned from the sample and representative reference signals of the bursts for production of the spectrum.

15. The system of claim 11, wherein the processor is configured to correct for instrumental frequency responses when obtaining the spectrum.

16. The system of claim 11, wherein the processor is configured to calculate from the spectrum an anti-resonance frequency where the phase difference measured as a function of frequency crosses zero.

17. The system of claim 16, wherein the processor is configured to calculate from the spectrum a tensile strength of an adherent at the interface based on the anti-resonance frequency.

18. The system of claim 11, wherein the processor is configured to calculate a tensile strength of an adherent based on a single lap joint model for the interface.

19. The system of claim 18, wherein the tensile strength of the adherent is calculated from a measured bondline reflection coefficient $R_{BL}$.

20. A system for ultrasonic testing of adhesion, comprising
   a) an ultrasonic wave generator configured to generate a first burst of ultrasonic waves at a first frequency for a first predetermined duration,
   b) an ultrasonic transducer configured to deliver the first burst into a sample having an interface which reflects the ultrasonic waves,
   c) an ultrasonic wave detector configured to measure a first echo of the ultrasonic waves from the interface, and
   d) a processor configured to monitor the first echo returned from the sample and a first reference signal representative of the first burst supplied to the sample, wherein
   the ultrasonic wave generator and the ultrasonic transducer are configured to provide bursts of different pulse widths, amplitudes and frequencies to the sample and
   the processor is configured to track cavity resonance as the amplitude of the bursts increase until the processor obtains a range of amplitudes and frequency shifts in the cavity resonance.

* * * * *